(12) United States Patent
Hinterstoisser et al.

(10) Patent No.: US 11,741,666 B2
(45) Date of Patent: Aug. 29, 2023

(54) GENERATING SYNTHETIC IMAGES AND/OR TRAINING MACHINE LEARNING MODEL(S) BASED ON THE SYNTHETIC IMAGES

(71) Applicant: GOOGLE LLC, Mountain View, CA (US)

(72) Inventors: Stefan Hinterstoisser, Munich (DE); Hauke Heibel, Munich (DE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/974,379

(22) Filed: Oct. 26, 2022

(65) Prior Publication Data

US 2023/0046655 A1 Feb. 16, 2023

Related U.S. Application Data

(63) Continuation of application No. 17/271,515, filed as application No. PCT/US2019/061872 on Nov. 15, 2019, now Pat. No. 11,488,351.

(Continued)

(51) Int. Cl.
*G06T 17/00* (2006.01)
*G06N 20/00* (2019.01)
*G06T 3/40* (2006.01)
*G06T 3/60* (2006.01)
*G06T 19/20* (2011.01)

(52) U.S. Cl.
CPC ............ *G06T 17/00* (2013.01); *G06N 20/00* (2019.01); *G06T 3/40* (2013.01); *G06T 3/60* (2013.01); *G06T 19/20* (2013.01); *G06T 2219/2016* (2013.01)

(58) Field of Classification Search
CPC ......... G06T 17/00; G06T 15/503; G06T 3/60; G06T 3/40; G06T 19/20; G06T 2219/2016; G06N 20/00
See application file for complete search history.

(56) References Cited

U.S. PATENT DOCUMENTS

2008/0246759 A1\* 10/2008 Summers .............. G06F 3/0304
348/E7.083
2009/0262135 A1\* 10/2009 Huston .............. H04N 21/8153
345/629

(Continued)

OTHER PUBLICATIONS

Tremblay, J. et al., "Training Deep Networks with Synthetic Data: Bridging the Reality Gap by Domain Randomization;" 2018 IEEE/CVF Conference on Computer Vision and Pattern Recognition Workshops; pp. 1082-1090; Jun. 18, 2018.

(Continued)

*Primary Examiner* — Xilin Guo
(74) *Attorney, Agent, or Firm* — Gray Ice Higdon

(57) ABSTRACT

Particular techniques for generating synthetic images and/or for training machine learning model(s) based on the generated synthetic images. For example, training a machine learning model based on training instances that each include a generated synthetic image, and ground truth label(s) for the generated synthetic image. After training of the machine learning model is complete, the trained machine learning model can be deployed on one or more robots and/or one or more computing devices.

20 Claims, 10 Drawing Sheets

Related U.S. Application Data

(60) Provisional application No. 62/768,571, filed on Nov. 16, 2018.

(56) References Cited

U.S. PATENT DOCUMENTS

| | | | |
|---|---|---|---|
| 2018/0039848 A1 | 2/2018 | Konolige et al. | |
| 2018/0077376 A1* | 3/2018 | Armeni | G06T 19/20 |
| 2019/0096125 A1* | 3/2019 | Schulter | G06T 7/50 |
| 2019/0251397 A1* | 8/2019 | Tremblay | G06F 18/2148 |
| 2021/0327127 A1 | 10/2021 | Hinterstoisser et al. | |

OTHER PUBLICATIONS

European Patent Office; International Search Report and Written Opinion of PCT Ser. No. PCT/US2019/061872; 17 pages; dated Feb. 26, 2020.

Bousmalis, K. et al., "Unsupervised Pixel-Level Domain Adaptation With Generative Adversarial Networks;" 2017 IEEE Conference on Computer Vision and Pattern Recognition (CVPR); 15 pages; 2016.

Ganin, Y., et al.; Domain-Adversarial Training of Neural Networks; Journal of Machine Learning Research; vol. 17, No. 59; pp. 1-35; dated 2016.

Bousmalis, K., et al.; Domain Separation Networks; Proc. Neural Information Processing Systems (NIPS); pp. 1-9; dated 2016.

Tobin, J. et al., "Domain Randomization for Transferring Deep Neural Networks From Simulation to the Real World;" 2017 IEEE/RSJ International Conference on Intelligent Robots and Systems (IROS), 8 pages, dated 2017.

Alhaija, H.A. et al., "Augmented Reality Meets Deep Learning for Car Instance Segmentation in Urban Scenes;" In British Machine Vision Conference; 12 pages; 2017.

Borrego, J. et al., "Applying Domain Randomization to Synthetic Data for Object Category Detection;" arXiv.org; ArXiv:1807.09834v1; 17 pages; Jul. 16, 2018.

Dai, J. et al., "R-FCN: Object Detection via Region-Based Fully Convolutional Networks;" Proceedings of the 30th International Conference on Neural Information Processing Systems; 9 pages; Dec. 2016.

Dwibedi, D. et al., "Cut, Paste and Learn: Surprisingly Easy Synthesis for Instance Detection;" arXiv.org, arXiv:1708.01642v1; 11 pages; Aug. 4, 2017.

Georgakis, G. et al., "Synthesizing Training Data for Object Detection in Indoor Scenes;" In Robotics: Science and Systems Conference; 9 pages; 2017.

Gupta, A. et al., "Synthetic Data for Text Localisation in Natural Images;" In Conference on Computer Vision and Pattern Recognition; 10 pages; 2016.

Huang, J. et al., "Speed and Accuracy Trade-Offs for Modern Convolutional Object Detectors;" In Conference on Computer Vision and Pattern Recognition; 10 pages; 2017.

Inoue, T. et al., "Transfer Learning From Synthetic to Real Images Using Variational Autoencoders for Precise Position Detection;" arXiv.org; ArXiv:1807.019990v1; 5 pages; Jul. 4, 2018.

Johnson-Roberson, M. et al., "Driving in the Matrix: Can Virtual Worlds Replace Human-Generated Annotations for Real World Tasks?" arXiv.org; arXiv:1610.01983v1; 8 pages; Oct. 6, 2016.

Kehl, W. et al., "SSD-6D: Making RGB-Based 3D Detection and 6D Pose Estimation Great Again;" arXiv.org; arXiv:1711.10006v1; 9 pages; Nov. 27, 2017.

Lin,T et al., "Focal Loss for Dense Object Detection;" In International Conference on Computer Vision; 9 pages; 2017.

Liu, S. et al., "SSD: Single Shot Multibox Detector;" In European Conference on Computer Vision; 17 pages; 2016.

Mitash, C. et al., "A Self-Supervised Learning System for Object Detection Using Physics Simulation and Multi-View Pose Estimation;" IEEE International Conference on Intelligent Robots and Systems (IROS); 7 pages; 2017.

Mlovshovitz-Attias, et al. "How Useful is Photo-Realistic Rendering for Visual Learning?" In European Conference on Computer Vision; 16 pages; 2016.

Phong, B.T., "Illumination for Computer Generated Pictures;" In Communications of the ACM; vol. 18, No. 6; 7 pages; Jun. 1975.

Prakash, A. et al., "Structured Domain Randomization: Bridging the Reality Gap by Context-Aware Synthetic Data;" arXiv.org; arXiv:1810.10093v1; 7 pages; Oct. 23, 2018.

Rad, M. et al.,"BB8: A Scalable, Accurate, Robust to Partial Occlusion Method for Predicting the 3D Poses of Challenging Objects without Using Depth;" In International Conference on Computer Vision; 9 pages; 2017.

Rajpura, P. et al. "Object Detection Using Deep CNNs Trained on Synthetic Images;" arXiv.org; arXiv.1706.06782v2; 8 pages; Sep. 18, 2017.

Redmon, J. et al., "Yolo9000: Better, Faster, Stronger;" In Conference on Computer Vision and Pattern Recognition; 9 pages; 2017.

Ren, S. et al., "Faster R-CNN: Towards Real-Time Object Detection with Region Proposal Networks;" In Advances in Neural Information Processing Systems; 9 pages; 2015.

Richter, S. et al., "Playing for Data: Ground Truth from Computer Games;" In European Conference on Computer Vision; 17 pages; 2016.

Rozantsev, A. et al., "Beyond Sharing Weights for Deep Domain Adaptation;" In Conference on Computer Vision and Pattern Recognition; IEEE; 14 pages, 2019.

Shrivastava, A. et al., "Learning from Simulated and Unsupervised Images through Adversarial Training;" In Conference on Computer Vision and Pattern Recognition; 10 pages; 2017.

Su, H. et al., "Render for CNN: Viewpoint Estimation in Images Using CNNs Trained with Rendered 3D Model Views;" In ICCV; 9 pages; 2015.

Szegedy, C. et al., "Inception—v4, Inception-ResNet and the Impact of Residual Connections on Learning;" In American Association for Artificial Intelligence Conference; 7 pages; 2017.

Tremblay, J. et al., "Deep Object Pose Estimation for Semantic Robotic Grasping of Household Objects;" In Conference on Robot Learning; arXiv:1809.10790v1; 11 pages; 2018.

Varol, G. et al., "Learning from Synthetic Humans;" In Conference on Computer Vision and Pattern Recognition; 9 pages; 2017.

Hinterstoisser, S. et al., "On Pre-Trained Image Features and Synthetic Images for Deep Learning;" In Proceedings of the ECCV Workshop on Recovering 6D Object Pose; 15 pages; 2018.

* cited by examiner

GENERATING SYNTHETIC IMAGES AND/OR TRAINING MACHINE LEARNING MODEL(S) BASED ON THE SYNTHETIC IMAGES

BACKGROUND

Detecting and/or classifying objects in challenging environments is a necessary skill for many machine vision and/or robotics tasks. For example, for a robot to manipulate (e.g., grasp, push, and/or pull) an object, the robot must be able to at least detect the object in vision data (e.g., determine a 2D and/or 3D bounding box that corresponds to the object). As another example, object detection and classification can be utilized by a robot to identify certain type(s) of object(s) and avoid collision with those certain type(s) of object(s).

Various machine learning models have been proposed for object detection and/or classification. For example, deep convolutional architectures have been proposed for object detection such as Faster R-CNNs, SSD, R-FCN, Yolo9000, and RetinaNet. The training of such models, which can include millions of parameters, requires a massive amount of labeled training data to achieve state-of-the-art results.

Training data that includes real images and corresponding human-assigned labels (e.g., labeled bounding box(es)) has been utilized in training such models. However, generating such training data can utilize significant computational and/or network resources. For example, in generating human-assigned label(s) for a real image, the real image must be transmitted to a client device utilized by a corresponding human reviewer. The real image is rendered at the client device, and the human reviewer must then utilize the client device to review the image and provides user interface input(s) to assign the label(s). The human-assigned label(s) are then transmitted to a server where they can then be paired with the real image and utilized in training a corresponding model. When labelling of hundreds of thousands (or even millions) of real images are considered, the transmissions to and from the client device consume significant network resources, and the rendering of the image and the handling of the user interface input(s) consume significant client device resources. Moreover, the human-assigned labels can include errors (e.g., misplaced bounding boxes) and the human labelling can be a time-consuming process. Further, setting up various real scenes and capturing real images can also be resource intensive.

Synthetic training data, that includes synthetic images and automatically assigned labels, has also been utilized in training such models. Synthetic training data can overcome some of the drawbacks with training data that includes real images and human-assigned labels. However, training a machine learning model mainly or only on synthetic training data, with synthetic images generated according to various prior techniques, can still result in a significant domain gap. This can be due to, for example, disparities between the synthetic images and real images. The domain gap can result in poor performance of the machine learning model, trained utilizing synthetic training data, when the machine learning model is utilized in making predictions based on real vision data.

SUMMARY

Implementations disclosed herein are directed to particular techniques for generating synthetic images and/or for training machine learning model(s) (e.g., neural network models) based on generated synthetic images (e.g., training based on training instances that each include a generated synthetic image, and ground truth label(s) for the generated synthetic image).

In some implementations, a method implemented by one or more processors is provided that includes identifying a size at which to render a foreground three-dimensional (3D) object model in a foreground layer for a synthetic image. The method further includes, for each of a plurality of randomly selected background 3D object models: rendering the background 3D object model, at a corresponding background location in a background layer for the synthetic image, with a corresponding rotation, and with a corresponding size that is determined based on the size at which the foreground 3D object model is to be rendered. The method further includes rendering the foreground 3D object model at a foreground location in the foreground layer. The rendering of the foreground 3D object model is at the size and being at a given rotation of the foreground 3D object model. The method further includes generating the synthetic image based on fusing the background layer and the foreground layer and assigning, to the synthetic image, a ground truth label for the rendering of the foreground 3D object model. The method further includes providing a training instance, that includes the synthetic image paired with the ground truth label, for training of at least one machine learning model based on the training instance.

These and other implementations of the technology disclosed herein can include one or more of the following features.

In some implementations, the method further includes determining, based on the size at which to render the foreground 3D object model, a range of scaling values. In those implementations, for each of the selected background 3D object models, rendering the selected background 3D object model with the corresponding size includes: selecting, from the range of scaling values, a corresponding scaling value; scaling the selected background 3D object model, based on the corresponding scaling value, to generate a corresponding scaled background 3D object model; and rendering the scaled background 3D object model at the corresponding background location in the background layer. In some version of those implementations, determining the range of scaling values includes determining a lower bound scaling value of the scaling values and determining an upper bound scaling value of the scaling values. In some of those versions, determining the lower bound scaling value is based on determining that the lower bound scaling value, if used to scale any one of the background 3D object models before rendering, would result in the corresponding size being at a lower percentage bound of a foreground size. In those versions, determining the upper bound scaling value is based on determining that the upper bound scaling value, if used to scale any one of the background 3D object models before rendering, would result in the corresponding sizes being at an upper percentage bound of the foreground size. The foreground size can be based on the size at which the foreground 3D object model is to be rendered and/or the size(s) at which additional foreground 3D object model(s) are to be rendered in the foreground layer. For example, the foreground size can be the same as the size at which to render the foreground 3D object model, or can be a function of the size and of at least one additional size of at least one additional foreground 3D object model that is also rendered in the foreground layer. The lower percentage bound can be, for example, between 70% and 99% and/or the upper percentage bound can be, for example, between 100% and 175%. Optionally, for each of the selected background 3D object models, selecting the corresponding scaling value comprises randomly selecting the corresponding scaling value, from amongst all scaling values within the range of scaling values.

In some implementations, for each of a plurality of the selected background 3D object models, rendering the selected background 3D object model at the corresponding background location includes selecting the background location based on no other background 3D object having yet been rendered at the background location. In some of those implementations, the rendering the selected background 3D object models is iteratively performed, each time for an additional of the selected background 3D object models. The iterative rendering of the selected background 3D object models can be performed until it is determined that one or more coverage conditions are satisfied. The coverage condition(s) can include, for example that all locations, of the background layer, have content rendered thereon, or can include that there are no bare areas that are greater than a threshold size (e.g., n contiguous pixels size).

In some implementations, the method further includes: selecting an additional background 3D object model; identifying a random location within a bounding area that bounds the rendering of the foreground 3D object model; and rendering the additional background 3D object model, in the random location and in an occlusion layer of the synthetic image. Rendering the additional background 3D object model can optionally include scaling the additional background 3D object model before rendering so as to occlude only a portion of the rendering of the foreground 3D object model. In those implementations, generating the synthetic image is based on fusing the background layer, the foreground layer, and the occlusion layer. In some versions of those implementations, an extent of the occluding can be based on the size at which the foreground object is to be rendered.

In some implementations, the foreground 3D object model is selected from a corpus of foreground 3D object models, the background 3D object models are randomly selected from a corpus of background 3D object models, and the corpus of foreground objects and the corpus of background objects are disjoint.

In some implementations, the method further includes generating an additional synthetic image that includes the foreground 3D object model rendered at a smaller size than the size at which the foreground 3D object is rendered in the synthetic image. The additional synthetic image further includes alternative background 3D object models rendered at corresponding alternative sizes determined based on the smaller size at which the foreground 3D object model is rendered in the additional synthetic image. In those implementations, the method further includes: assigning, to the additional synthetic image, an additional ground truth label for the rendering of the foreground 3D object model in the additional synthetic image; and providing an additional training instance, that includes the additional synthetic image paired with the additional ground truth label, for further training of the at least one machine learning model. The further training of the at least one machine learning model based on the additional training instance can be, based on the foreground object being rendered at the smaller size, subsequent to training of the at least one machine learning model based on the training instance. Optionally, the additional synthetic image can include an occluding object, that occludes the rendering of the 3D object model to a greater extent than any occlusion of the rendering of the 3D object model in the synthetic image. This greater extent of occlusion can be based on the foreground object being rendered at the smaller size in the additional synthetic image. Optionally, the method can further include training the machine learning model based on the training instance and, subsequent to training the machine learning model based on the training instance, training the machine learning model based on the additional training instance.

In some implementations, the ground truth label includes a bounding shape for the foreground object, a six-dimensional (6D) pose for the foreground object, and/or a classification for the foreground object. For example, the ground truth label can include the bounding shape, and the bounding shape can be a two-dimensional bounding box.

In some implementations, rendering the foreground 3D object model at the foreground location in the foreground layer includes randomly selecting the foreground location, from a plurality of foreground locations that do not yet have a rendering of a foreground 3D object model.

In some implementations, a method implemented by one or more processors is provided that includes: selecting a foreground three-dimensional (3D) object model; and generating, with the foreground 3D object model at a first scale, a plurality of first scale rotations for the foreground 3D object model. The method further includes, for each of the plurality of first scale rotations for the foreground 3D object model, rendering the foreground 3D object model, at a corresponding one of the first scale rotations and at the first scale, in a corresponding randomly selected location in a corresponding first scale foreground layer. The method further includes generating first scale synthetic images. Generating each of the corresponding first scale synthetic images includes: fusing a corresponding one of the corresponding first scale foreground layers with a corresponding one of a plurality of disjoint first scale background layers that each include corresponding renderings of corresponding randomly selected background 3D object models. The method further includes generating first scale training instances that each include a corresponding one of the first scale synthetic images, and a corresponding ground truth label for the rendering of the foreground 3D object model in the corresponding one of the first scale synthetic images. The method further includes generating, with the foreground 3D object model at a second scale that is a smaller scale than the first scale, a plurality of second scale rotations for the foreground 3D object model. The method further includes, for each of the plurality of second scale rotations for the foreground 3D object model: rendering the foreground 3D object model, at a corresponding one of the second scale rotations and at the second scale, in a corresponding randomly selected location in a corresponding second scale foreground layer. The method further includes generating second scale synthetic images. Generating each of the corresponding second scale synthetic images includes fusing a corresponding one of the corresponding second scale foreground layers with a corresponding one of a plurality of disjoint second scale background layers that each include corresponding renderings of corresponding randomly selected background 3D object models. The method further includes generating second scale training instances that each include a corresponding one of the second scale synthetic images, and a corresponding ground truth label for the rendering of the foreground 3D object model in the corresponding one of the second scale synthetic images. The method further includes training a machine learning model based on the first scale training instances prior to training of the machine learning model based on the second scale training instances.

These and other implementations of the technology disclosed herein can include one or more of the following features.

In some implementations, the corresponding renderings of the corresponding randomly selected background 3D object models, in the first scale background layers, are all of a smaller size than the corresponding renderings of the corresponding randomly selected background 3D object models in the second scale background layers.

In some implementations, the corresponding renderings of the corresponding randomly selected background 3D object models, in the first scale background layers, are all within a threshold percentage range of the first scale; and the corresponding renderings of the corresponding randomly selected background 3D object models, in the second scale background layers, are all within a threshold percentage range of the second scale.

In some implementations, a method implemented by one or more processors is provided that includes: training a machine learning model utilizing first scale training instances that each include a corresponding first scale synthetic image and at least one corresponding label. The corresponding first scale synthetic images each include one or more corresponding first scale foreground objects that are each within a first range of sizes. The method further includes, subsequent to training the machine learning model utilizing the first scale training instances, and based on having trained the machine learning model utilizing the first scale training instances: further training the machine learning model utilizing second scale training instances. The second scale training instances each include a corresponding second scale synthetic image and at least one corresponding label. The corresponding second scale synthetic images each include one or more corresponding second scale foreground objects that are each within a second range of sizes. The sizes of the second range of sizes are all smaller than the sizes of the first range of sizes. Optionally, the corresponding first scale synthetic images, of the first scale training instances, are void of any foreground objects that are within the second range of sizes.

This method and other implementations of technology disclosed herein may each optionally include one or more of the following features.

In some implementations, the corresponding first scale synthetic images include corresponding first extents of occlusions, of the corresponding first scale foreground objects, that are lesser (on average, or on each individual basis) than corresponding second extents of occlusions, of the corresponding second scale foreground objects.

Other implementations can include one or more non-transitory computer readable storage media storing instructions executable by a processor (e.g., a central processing unit (CPU) or graphics processing unit (GPU)) to perform a method such as one or more of the methods described herein. Yet another implementation can include a system of one or more computers that include one or more processors operable to execute stored instructions to perform a method such as one or more (e.g., all) aspects of one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
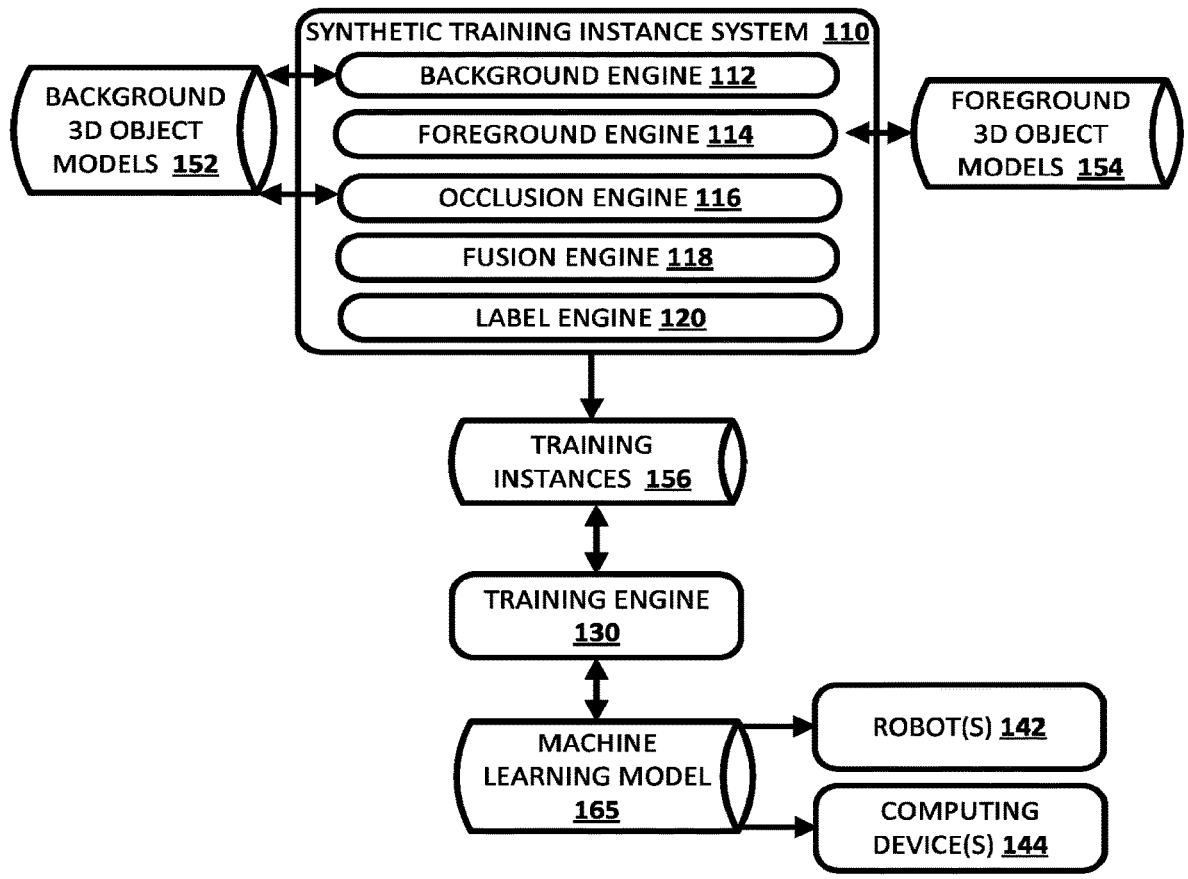
FIG. 1 illustrates an example environment according to various implementations disclosed herein.

Some implementations disclosed herein generate purely synthetic training instances that each include a synthetic image, and corresponding synthetic ground truth label(s). The synthetic ground truth label(s) can include, for example, 2D bounding box(es) for foreground object(s) in the synthetic image, classification(s) for the foreground object(s), and/or other label(s). In some of those implementations, each synthetic image is generated by fusing/blending three image layers: (1) a purely synthetic background layer (2) a purely synthetic foreground layer; and (3) an optional purely synthetic occlusion layer. Implementations of generating each of these three layers is now addressed in turn, starting initially with description of generating the background layer.

Proposed techniques for generating the background layer can seek to: maximize background clutter; minimize the risk of having the same background layer be present in multiple synthetic images; create background layers with structures that are similar in scale to the object(s) in the corresponding foreground layers; and/or present foreground and background layers from in the same domain. Experiments indicate that these principles, alone and/or in combination, can create synthetic images that, when utilized in training instances to train a machine learning model, train the model to learn the geometric and visual appearance of objects. Moreover, such principle(s) mitigate the chances of training the model to instead learn to distinguish synthetic foreground objects from background objects simply from the foreground objects and background objects having different properties (e.g., different object sizes and/or noise distributions).

The background layers can be generated from a corpus/dataset of textured background 3D object models. A large quantity (e.g., 10,000 or more, 15,000 or more) of background 3D object models can be included in the corpus. Moreover, the corpus of background 3D object models are disjoint from the corpus of foreground 3D object models. Put another way, none of the background 3D object models can be included amongst the foreground 3D object models. All background 3D object models can optionally be initially demeaned and scaled, such that they fit into a unit sphere.

A background layer can be generated by successively selecting regions in the background where no other background 3D object model has been rendered (a "bare region"), and rendering a random background 3D object model onto each selected region. Each background 3D object model can be rendered with a random rotation, and the process is repeated until the whole background is covered with synthetic background objects (i.e., until no bare regions remain). The risk of having the same background layer in multiple background images can be mitigated through randomly selecting the background 3D object models, rendering each selected background 3D object model with a random rotation and translation, and/or through identifying bare regions. As used herein, it is noted that random includes both truly random and pseudo-random.

In various implementations, the size of the projected background objects, in a background layer, can be determined with respect to the size of foreground object(s) that are to be rendered in a foreground layer that is subsequently fused with the background layer in generating a synthetic image. Put another way, background objects in a background layer can be similar in scale to the foreground object(s) in the corresponding foreground layers. This can enable a machine learning model, trained based on such synthetic images, to learn the geometric and visual appearance of objects, while mitigating the chances of training the model to instead learn to distinguish synthetic foreground objects from background objects simply from size differences between the background and foreground objects.

In some implementations, in generating projected background objects with sizes that are similar (e.g., 90% to 150% of the size, or other size range) to foreground object(s), a randomized isotropic scaling S can be generated. The randomized isotropic scaling can be applied to selected background 3D object models before rendering them. As mentioned above, the background 3D object models of a corpus can all be of a similar scale initially (e.g., they can be initially demeaned and scaled, such that they fit into a unit sphere). The randomize isotropic scaling applied to selected background 3D object models can be used to create background objects such that the size of their projections to the image plane is similar to a foreground size, where the foreground size can be based on size(s) of foreground object(s) (e.g., the average size of foreground object(s)). For example, a scale range $S=[s_{min}, s_{max}]$ can be generated, which represents the scaling values that can be applied to background 3D object models such that they appear within [0.9, 1.5] (or other percentage range) of the foreground size. The foreground size can be computed by the average projected size (or by any other statistical mean) of all projected foreground object sizes from all foreground objects rendered in the current image. In generating each background layer, a random sub-set $S_{bg} \subset S$ can be generated to ensure that not only are background layers created with objects being uniformly distributed across all sizes, but also background layers are created with primarily large or small objects. The isotropic scaling value, $s_{bg}$, applied to each background 3D object model, can be drawn randomly from $S_{bg}$ such that background object sizes in the image are uniformly distributed. Put another way, in selecting a scaling value for a given background 3D object model to be rendered, the scaling value can be randomly selected from scaling values within a range and with a uniform distribution. Accordingly, some background layers will include uniformly distributed object sizes, others will have primarily (or solely) large (relative to the scaling range) objects, and others will have primarily (or solely) small (relative to the scaling range) objects.

In some implementations, for each background layer, each rendered object's texture can be converted into hue, saturation, value (HSV) space, the hue value of the object randomly changed and, after changing the hue value, the HSV space can be converted back to red, green, blue (RGB) space. This can diversify the background layers and ensure that background colors are well distributed. Any other foreground and/or background color transformation(s) can additionally and/or alternatively be applied. Accordingly, through application of the color transformation(s), the risk of having the same background layer in multiple synthetic images is further mitigated.

Turning now to generating each foreground layer, each foreground layer can include rendering(s) of foreground 3D object model(s). As described below, the rotation (combination of an in-plane rotation and out-of-plane rotations) of a foreground 3D object model in a rendering can be selected from a set of rotations generated for the foreground 3D object model, and the size of the rendering can be selected based on it conforming to that utilized in generating the corresponding background layer. Put another way, for a foreground 3D object model it will be rendered in multiple different foreground layers (once in each), and each rendering will include the corresponding object in a disparate rotation and/or at a different size (relative to other renderings). The set of rotations generated for a foreground 3D object model can be determined based on a desired pose space to be covered for the object. Put another way, the set of rotations can collectively cover the pose space, for the object, for which it is desirable to be able to predict value(s) for the object using the machine learning model once trained. The rotations and sizes for corresponding objects can optionally be determined and utilized in foreground generation according to ensure that each of the foreground objects is rendered at the multiple disparate rotations and/or the different sizes across multiple synthetic images. For example, the same n disparate rotations can be generated at each of a plurality of disparate scales, and each rotation, scale pairing for each foreground object can be rendered in at least one (and optionally only one) foreground layer. In these and other manners, each foreground object will appear in multiple synthetic images at disparate rotations and at different sizes. Moreover, the training of a machine learning model can be based initially on the synthetic images with the larger size foreground objects, then synthetic images with smaller size foreground objects, then synthetic images with even smaller size foreground objects. As described herein, training in such a manner can result in improved performance (e.g., accuracy and/or recall) of the trained machine learning model.

For rendering, cropping of foreground objects at the image boundaries can be allowed to an extent (e.g., up to 50% cropping or other threshold of cropping). Further, for rendering, overlap between pairs of rendered foreground objects can be allowed to an extent (e.g., up to 30% overlap or other threshold overlapping). For each object, it can be placed in a random location, with additional attempts at placing if the random location(s) of the initial attempt(s) fail (e.g., due to too much cropping at the image boundary and/or too much overlap). For example, random placement attempts, up to n=100 times (or other threshold) can be performed. If the foreground object being processed cannot be placed within the foreground layer within the threshold quantity (and/or duration) of attempts due to violations of the cropping constraint, overlap constraint, and/or other constraint(s)–processing of the current foreground layer can halt, and the foreground object being processed instead placed in a next foreground layer to be processed. Put another way, in some implementations multiple foreground 3D object models can be rendered in a foreground layer, and rendering of new objects will continue until it is determined that no more foreground objects can be placed through random attempts (e.g., after 100 attempts or other threshold), without violating constraint(s).

As mentioned above, for each foreground 3D object model, a large set of rotations can be generated. The set of rotations can, for example, uniformly cover the rotation space in which it is desirable to be able to detect the corresponding object. As one example of generating a large set of rotations for a foreground object, an icosahedron, the largest convex regular polyhedron of the foreground object 3D model, can be recursively divided. This can yield uniformly distributed vertices on a sphere and each vertex represents a distinct view defined by two out-of-plane rotations. In addition to these two out-of-plane rotations, in-plane rotations can also be equally sampled. Furthermore, the distance at which a foreground object is rendered can be sampled inversely proportional to its projected size to guarantee an approximate linear change in pixel coverage of the projected object between consecutive scale levels.

Opposite to the background layer generation, the rendering of the foreground objects can optionally occur based on a curriculum strategy. Put another way, this means that there can be a deterministic schedule at which step each foreground object and rotation should be rendered (or at least at which step the corresponding synthetic images are provided for training). For example, rendering can start with the scale that is closest to the camera and gradually move to the one that is farthest away. As a result, each object initially appears largest in initial synthetic images, being therefore easier to learn for the machine learning model being trained. As learning proceeds, the objects become smaller in the later initial synthetic images, and more difficult to learn for the machine learning model being trained. For each scale of a foreground object, all considered out-of-plane rotations can be iterated through, and for each out-of-plane rotation, all considered in-plane rotations can be iterated through, thereby creating a plurality of rotations for the foreground object, at a corresponding scale. Once the rotations, for a scale, are generated for all foreground objects, all foreground objects can be iterated through during generation of foreground layers, and each of them rendered with the given rotation at a random location using a uniform distribution. As described herein, the foreground layers with rendered objects at corresponding size(s) can be fused with background layers, having background object sizes that are based on the size(s), in generating synthetic images. After processing all foreground objects at all rotations for a given size/scale level, the process can be repeated for the next (smaller) scale level.

Turning now to occlusion layer generation, an occlusion layer can be generated where random objects (e.g., from the corpus of background 3D objects) can partially occlude foreground object(s), through their inclusion in corresponding locations in a corresponding foreground layer. In some implementations, this is done by determining the bounding box (or other bounding shape) of each rendered foreground object in the foreground layer, and by rendering a randomly selected occluding object at a uniform random location, within this bounding box, but in the occlusion layer. The occluding object can be randomly scaled such that its projection covers a certain percentage of the corresponding foreground object (e.g., in a range of 10% to 30% coverage of the foreground object). The rotation and/or color of the occluding object can optionally be randomized (e.g., in the same way it is done for background objects). In some implementations, whether occlusion(s) of foreground object(s) are generated for a synthetic image, a quantity of foreground object(s) that are occluded for the synthetic image, and/or an extent of coverage of the occlusion can be dependent on the size(s) of the foreground object(s). For example, with synthetic images having larger foreground objects, lesser occlusion can be utilized as compared to occlusion with synthetic images having relatively smaller foreground objects. This can be utilized as part of the curriculum strategy described herein, to enable the machine learning model to learn initially based on the synthetic images with less occlusion, then learn on the "tougher" synthetic images with more occlusion.

Having a corresponding background layer, foreground layer, and occlusion layer, all three layers can be fused to generate a combined purely synthetic image. For example, the occlusion layer can be rendered on top of the foreground layer and the result can rendered on top of the background layer. In some implementations, random light sources are added during rendering, optionally with random perturbations in the light color. Additionally or alternatively, white noise can be added and/or the synthetic image blurred with a kernel (e.g., Gaussian kernel) where both the kernel size and the standard deviation, are randomly selected. Accordingly, the background, foreground and the occluding parts share the same image properties which is contrary to other approaches where real images and synthetic renderings are mixed. This can make it impossible for a machine learning model being trained to differentiate foreground vs. background merely on attributes specific to their domain. Put another way, this can force the machine learning model to effectively learn to detect foreground objects, and/or one or more properties of the foreground objects, based on their geometric and visual appearance.

Through utilization of techniques described above and/or elsewhere herein, synthetic images are generated that can each be paired with ground truth automatically generated label(s) to generate a corresponding synthetic training instance. Utilization of such synthetic training instances (and optionally utilizing only synthetic training instances, or 90% or greater percentage of synthetic training instances) to train a machine learning model can result in a trained model that outperforms a corresponding model that is instead trained based on a same quantity of only real images and human provided labels. Various techniques disclosed above and/or elsewhere herein can improve the performance of a machine learning model trained based on the synthetic training instances, such as, for example, curriculum techniques described herein, relative scale of background objects with respect to foreground objects, using synthetic background objects, and/or utilization of random colors and blur.

Accordingly, various implementations disclosed herein create purely synthetic training data for training a machine learning model, such as an object detection machine learning model. Some of those implementations leverage a large dataset of 3D background models and densely render them, in background layers, using full domain randomization. This yields background layers with locally realistic background clutter with realistic shapes and texture, on top of which foreground objects of interest can be rendered. Optionally, during training, a curriculum strategy can be followed that guarantees that all foreground models are presented to the network equally under all possible rotations and conditions with increasing complexity. Optionally, randomized illumination, blur, and/or noise are added during generation of the synthetic images. Various implementations disclosed herein do not require complex scene compositions as in, difficult photo-realistic image generation, or real background images to provide the necessary background clutter.

Turning now to FIG. 1, an example environment is illustrated in which implementations disclosed herein can be implemented. The example environment includes a synthetic training instance system 110. The training instance system 110 can be implemented by one or more computing devices, such as a cluster of one or more servers. The training instance system 110 includes a background engine 112, a foreground engine 114, an occlusion engine 116, a fusion engine 118, and a label engine 120.

The background engine 112 generates background layers for synthetic images. In generating the background layers, the background engine 112 can utilize background 3D object models from background 3D object models database 152. The background 3D object models database 152 can include a large quantity (e.g., 10,000 or more) background 3D object models that can be selected and utilized by the background engine 112 in generating background layers. All background 3D object models can optionally be initially demeaned and scaled, such that they fit into a unit sphere.

In some implementations, the background engine 112 can perform one or more (e.g., all) blocks of the method 200 of FIG. 2 (described below). In various implementations, the background engine 112 generates a background layer by successively selecting regions in the background where no other background 3D object model has been rendered (a "bare region"), and rendering, onto each selected region, a random background 3D object model with a random rotation. The background engine 112 can repeat this process is repeated until the whole background is covered with synthetic background objects. In various implementations, the background engine 112 determines the size of the projected background objects, used in generating a background layer, based on the size of foreground object(s) that are to be rendered in a foreground layer that is subsequently fused with the background layer in generating a synthetic image. In some implementations, for each background layer, the background engine 112 converts each rendered object's texture into HSV space, randomly changes the hue value in the HSV space, and then converts back to RGB space.

The foreground engine 114 generates foreground layers for synthetic images. In generating the foreground layers, the foreground engine 114 can utilize foreground 3D object models from foreground 3D object models database 154. The foreground 3D object models of the foreground 3D object models database 154 can optionally be disjoint with those of the background 3D object models database 152. All foreground 3D object models can optionally be initially demeaned and scaled, such that they fit into a unit sphere.

The foreground engine 114, in generating a foreground layer, can include rendering(s) of foreground 3D object model(s). The foreground engine 114 can select the rotation of a foreground 3D object model in a rendering from a set of rotations generated for the foreground 3D object model, and the size of the rendering can be selected based on it conforming to that utilized in generating the corresponding background layer. The foreground engine 114 can optionally determine the rotations and sizes for corresponding objects can according to a curriculum strategy, to ensure that each of the foreground objects is rendered at the multiple disparate rotations and/or the different sizes across multiple synthetic images.

In rendering foreground 3D object models in a foreground layer, the foreground engine 114 can allow cropping of foreground objects at the image boundaries to an extent and/or can allow overlap between pairs of rendered foreground objects can be to an extent (the same or additional extent). For each object, the foreground engine 114 can place it in a random location, with additional attempts at placing if the random location(s) of the initial attempt(s) fail (e.g., due to violating cropping and/or overlap constraints). If the foreground object being processed cannot be placed within the foreground layer within a threshold quantity (and/or duration) of attempts, the foreground engine 114 can consider processing of the current foreground layer complete, and the foreground object currently being processed can be rendered in a next foreground layer to be processed. In some implementations, the foreground engine 114 can perform one or more (e.g., all) of blocks 302, 304, 306, 308, 310, and/or 312 of the method 300 of FIG. 3 (described below).

The occlusion engine 116 generates occlusion layers for synthetic images. In some implementations, the occlusion engine 116 can generate an occlusion layer by determining a corresponding bounding box (or other bounding shape) of one or more rendered foreground objects in a corresponding foreground layer, and rendering a corresponding randomly selected occluding object at a uniform random location, within the corresponding bounding box, but in the occlusion layer. The occluding object can be, for example, a background 3D object model selected from background 3D object models database 152. The occlusion engine 116 can scale the object such that its projection covers less than an upper bound percentage (e.g., 30%) and/or greater than a lower bound percentage (e.g., 5%) of the corresponding foreground object. The occlusion engine 116 can determine a random rotation of the occluding object and/or can color the occluding object randomly (e.g., using the HSV adjustment technique described herein).

The fusion engine 118 generates synthetic images by fusing a corresponding background layer, foreground layer, and occlusion layer. For example, the fusion engine 118 can render the occlusion layer on top of the foreground layer and then render the result on top of the background layer. In some implementations, the fusion engine 118 adds random light sources during rendering, optionally with random perturbations in the light color. Additionally or alternatively, the fusion engine 118 adds white noise and/or blurs the synthetic image (e.g., with a Gaussian kernel where the kernel size and/or the standard deviation are randomly selected. In some implementations, the fusion engine 118 can perform block 314 of the method 300 of FIG. 3 (described below).

The label engine 120 generates label(s) for each synthetic image generated by the fusion engine 118. For example, the label engine 120 can generate, for a synthetic image, label(s) such as labels that include a corresponding 2D bounding box (or other bounding shape) for each of the rendered foreground objects and/or a classification for each of the rendered foreground objects. The label engine 120 can determine the labels from, for example, the foreground engine 114 as the foreground engine 114 determines 3D objects and their rotations and locations in generating the foreground layer. The label engine 120 provides each pair of a synthetic image and corresponding label(s) as a training instance for storage in training instances database 156. In some implementations, the label engine 120 can perform block 316 of the method 300 of FIG. 3 (described below).

FIG. 1 further includes a training engine 130 that trains a machine learning model 165 based on the training instances of training instances database 156. The machine learning model 165 can be configured for use in processing an image (e.g., can have an input layer that conforms to dimensions of the synthetic images—or scalings thereof) to generate one or more predictions based on the image (e.g., prediction(s) corresponding to the labels generated by the label engine 120). As some non-limiting examples, the machine learning model 165 can be a Faster R-CNN, SSD, R-FCN, Yolo9000, or RetinaNet Faster model. In training the machine learning model, the training engine 130 can process the synthetic images of the training instances to generate predictions, compare those predictions to labels of the corresponding training instances to determine errors, and update weights of the machine learning model 165 based on the errors. The training engine 130 can optionally utilize batch techniques during training. As described herein, in various implementations the training engine 130 can utilize a curriculum strategy during training, in which training instances that include synthetic images with larger foreground objects are first utilized during training, followed by training instances that include synthetic images with relatively smaller foreground objects (relative to the larger foreground objects), optionally followed by one or more instances of further training instances that include synthetic images with relatively smaller foreground objects (relative to the foreground objects of an immediately preceding instance). In some implementations, the training engine 130 can perform one or more (e.g., all) of the blocks of the method 400 of FIG. 4 (described below).

After training of the machine learning model 165 is complete, the trained machine learning model can be deployed on one or more robots 142 and/or one or more computing devices 144. Robot(s) 142 can share one or more aspects in common with robot 620 described below. The computing device(s) can share one or more aspects in common with computing device 710 described below. The training of the machine learning model 165 can be determined to be complete responsive to determining one or more training criteria are satisfied. The training criteria can include, for example, performance of a threshold quantity of training epochs, training based on a threshold quantity of (e.g., all available of) training instances, determining that performance criteria of the machine learning model are satisfied, and/or of the training criteria.

Figure 2:
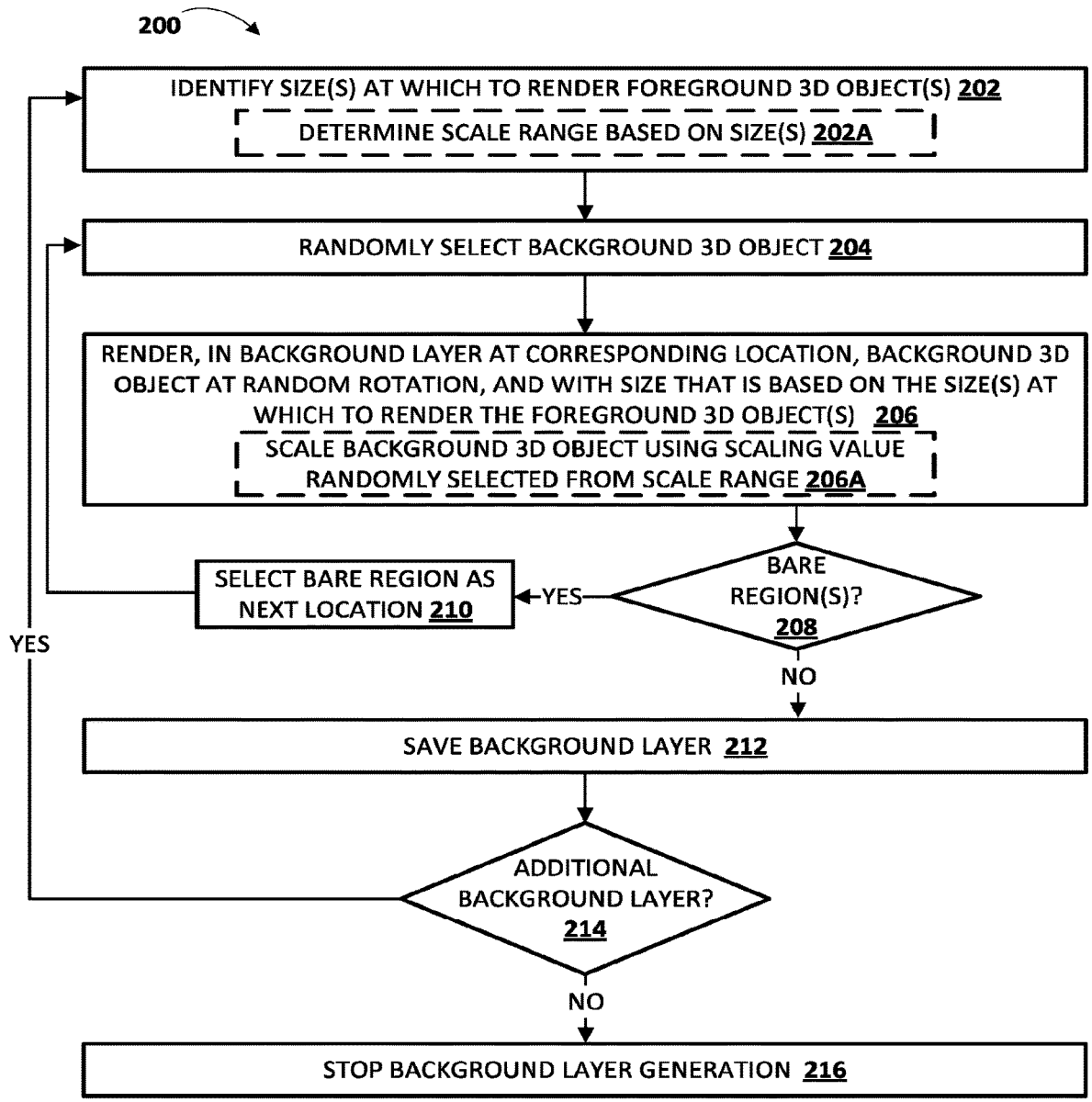
FIG. 2 is a flowchart illustrating an example method of generating background layers according to various implementations disclosed herein.

FIG. 2 is a flowchart illustrating an example method 200 of generating background layers according to various implementations disclosed herein. For convenience, the operations of the flow chart are described with reference to a system that performs the operations. This system may include one or more processors, such as one or more processors implementing background engine 112 (FIG. 1). While operations of method 200 are shown in a particular order, this is not meant to be limiting. One or more operations may be reordered, omitted, or added.

At block 202, the system identifies size(s) at which to render foreground 3D object(s). For example, at a given iteration the system can identify size(s) or scale(s) at which foreground 3D objects are to be rendered in a foreground layer with which the background layer will be fused (see FIG. 3) in generating a synthetic image. In some implementations, the determination at block 202 can be made at each iteration for each background layer that is being generated. For example, the determination can be based on a corresponding particular foreground layer that has already been generated, that is being generated in parallel, or that will be generated shortly after generating the background later. In some other implementations, the determination at block 202 can be made once for a batch of background layers to be generated and subsequently fused with corresponding foreground layers, of a batch of foreground layers, that all have same or similar size(s) of foreground object(s).

Block 202 can optionally include sub-block 202A, where the system determines a scale range based on the size(s) at which to render the foreground 3D object(s). The scale range can define an upper scaling value, a lower scaling value, and scaling values between the upper and lower scaling values. The scaling values can each be an isotropic scaling value that can be applied to a background 3D object model to uniformly "shrink" or "expand" (in dependence of the particular value) the background 3D object model. In some implementations, at sub-block 202A the system determines the scale range based on determining that the scaling values of the scale range, if applied to 3D object models, would cause the models to be within a corresponding percentage range of a foreground size. The foreground size is based on the size(s) at which to render the foreground 3D object(s). For example, the foreground size can be an average of the sizes of multiple foreground 3D objects. The percentage range can be, for example, from 70% to 175%, from 90% to 150%, from 92% to 125%, or other percentage range.

At block 204, the system randomly selects a background 3D object. For example, the system can randomly select the background 3D object from a corpus of background 3D objects, such as a corpus that includes over 1,000, over 5,000, or over 10,000 disparate background 3D objects. Optionally, the corpus of background 3D objects includes (e.g., is restricted to) objects that are specific to an environment for which synthetic images are being generated. For example, if the synthetic images are being generated for a home environment, typical household objects can be included in the background 3D objects of the corpus.

At block 206, the system renders, in the background layer at a corresponding location, the background 3D object at a random rotation (e.g., random in-plane and/or out-of-plane rotations), and with a size that is based on the size(s) at which to render the foreground 3D object(s). It is noted that, in rendering the background 3D object, the rendering of the background object can overlap and/or intersect with other already rendered background object(s). In some implementations, the system selects the corresponding location based on it being a region that is currently bare (i.e., currently lacks any rendered objects).

In some implementations, the system renders the background, with the size that is based on the size(s) of block 202, by isotropically scaling the background 3D object, prior to rendering, by an isotropic scaling value that is based on the size. For example, at optional block 206A, the system can scale the background object using a scaling value that is randomly selected from the scale range optionally determined at block 202A. In some implementations, anisotropic scaling can additionally or alternatively be utilized for scaling of object(s) (background or foreground). In some implementations, at block 202, during and/or after rendering of the background object, the background object's texture colors are randomly perturbed. As one non-limiting example, the background object's texture can be converted into HSV space, the hue value of the object randomly changed and, after changing the hue value, the HSV space can be converted back to red, green, blue (RGB) space. It is noted that while blocks 204 and 206 are described with respect to a single background 3D object for simplicity in description, in some implementations and/or iterations of blocks 204 and 206, multiple background 3D objects can be selected in block 204 and those multiple background 3D objects rendered (in corresponding locations) at block 206. Selecting and rendering multiple background 3D objects can increase the rendering/data generation throughput.

At block 208, the system determines whether there are any bare regions remaining in the background layer. In some implementations, in determining whether a region is a bare region, the system determines whether the region is of at least a threshold size. For example, the system can determine a region is a bare region only if there are at least a threshold quantity of contiguous bare pixels (in one or more directions) in that region. For instance, a region can be determined bare if a quantity of bare pixels in that region is greater than a threshold quantity of pixels, and considered not bare otherwise. In some implementations, the threshold quantity can be zero, meaning that there will be truly no bare pixels. If the determination at block 208 is yes (i.e., the system determines there is a bare region), the system proceeds to block 210 and selects the bare region as a next location, then proceeds back to block 204, where it randomly selects an additional background 3D object. The system then proceeds to block 206 and renders the additional background 3D object, in the background layer at the next location of block 210, and at a random rotation and with a size that is based on the size(s). Through multiple iterations, a background layer can be generated that is free of bare regions/full of background clutter.

If, at an iteration of block 208, the system determines no bare regions remain, the system proceeds to block 212 and saves the background layer that includes the rendered objects from multiple iterations of block 206. As described in method 300 of FIG. 3, the saved background layer 212 will subsequently be fused with a foreground layer, and optionally an occlusion layer, in generating a synthetic image.

At block 214, the system determines whether to generate an additional background layer. If so, the system proceeds back to block 202 (although block 202 can be skipped, in batch techniques, when the size(s) remain the same for multiple background layers), and performs multiple iterations of blocks 204, 206, 208, and 210 in generating an additional background layer. If the decision at block 214 is no, the system can proceed to block 216 and stop background layer generation.

Figure 3:
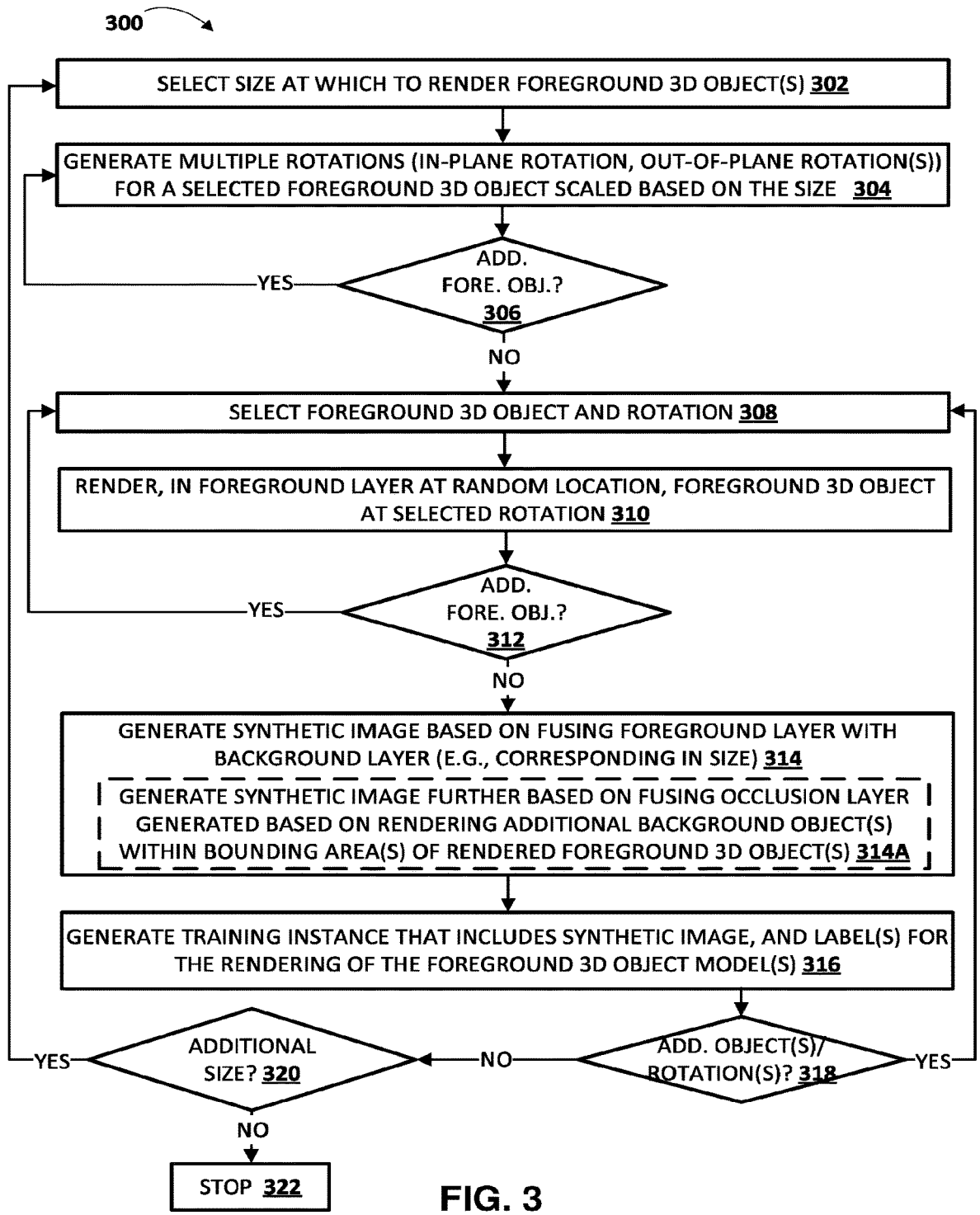
FIG. 3 is a flowchart illustrating an example method of generating foreground layers, generating synthetic images based on fusing a corresponding foreground layer, background layer, and optionally an occlusion layer, and generating training instances that include the synthetic images, according to various implementations disclosed herein.

FIG. 3 is a flowchart illustrating an example method 300 of: generating foreground layers; generating synthetic images based on fusing a corresponding foreground layer background layer, and optionally occlusion layer; and generating training instances that include the synthetic images, according to various implementations disclosed herein. For convenience, the operations of the flow chart are described with reference to a system that performs the operations. This system may include one or more processors, such as one or more processors implementing foreground engine 114, occlusion engine 116, fusion engine 118, and/or label engine 120 (FIG. 1). While operations of method 300 are shown in a particular order, this is not meant to be limiting. One or more operations may be reordered, omitted, or added.

Figure 4:
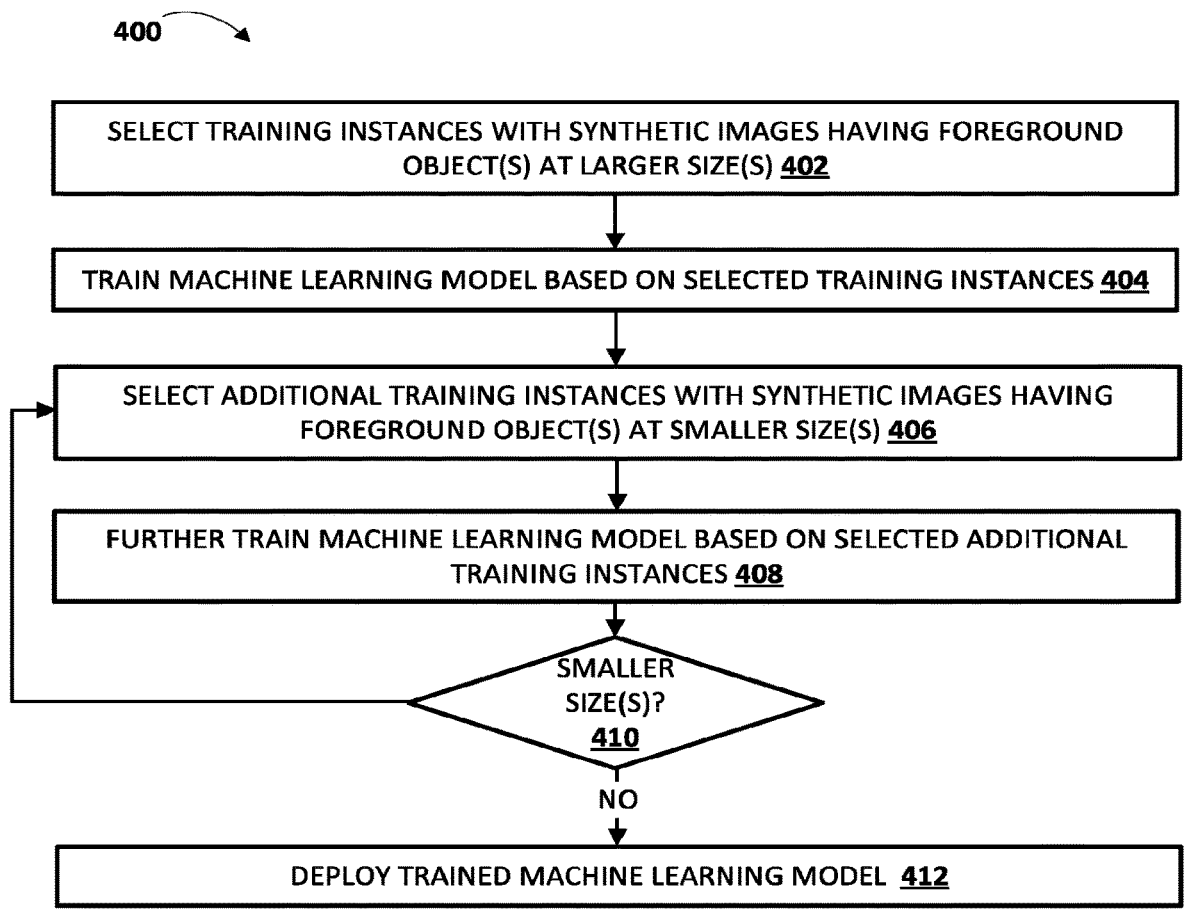
FIG. 4 is a flowchart illustrating an example method of training a machine learning model according to a curriculum, according to various implementations disclosed herein.

Initially, it is noted that while method 300 of FIG. 3 and method 400 of FIG. 4 are illustrated separately, in various implementations they can be performed in concert and/or in parallel. For example, foreground layer generation at iterations blocks 308, 310, and 312 of method 300 can occur in concert with generation of a corresponding background layer at iterations of blocks 202, 204, 206, 208, and 210 of method 200.

At block 302, the system selects size(s) at which to render foreground 3D object(s). As described herein, in some implementations larger size(s) (e.g., occupying more pixels) of foreground object rendering can be used in generating an initial set of synthetic images, that are used in initial training instances for initially training a machine learning model. Further, smaller size(s) of foreground object rendering can be used in generating a next set of synthetic images, that are used in a next set of training instances for training the machine learning model. Additional set(s) of synthetic image(s) can be generated, each including smaller size(s) of foreground object rendering (relative to sizes of the previous set), and successively used in yet further training the machine learning model. Training the machine learning model according to such a curriculum strategy can lead to improved performance of the trained machine learning model and/or reaching a given performance level with a smaller quantity of training instances. An implementation of this is described below with respect to method 400 of FIG. 4.

At block 304, the system generates multiple rotations for a selected foreground 3D object that is scaled based on the size selected at block 302. Each of the rotations can include a different paring of an in-plane rotation (in-plane relative to the image place) and out-of-plane rotations. In some implementation(s), n different combinations of out-of-plane rotations are generated, and for each of the out-of-plane rotations, m different in-plane rotations are generated. For example, an icosahedron can be recursively divided to generate the n different uniformly distributed combinations of out-of-plane rotations, and m different in-plane rotations can be generated for each combination of out-of-plane rotations. The in-plane rotations can also be uniformly distributed, with a given degree of discretization between in-plane rotations (e.g., 1 degree or other discretization). The scaling to the size can be based on isotropic scaling of the foreground 3D object model and the rotation(s) can be generated through manipulating of the rotations of the foreground 3D object model. Accordingly, in various implementations, at conclusion of an iteration of block 304, multiple rotations for a foreground 3D object model are generated, each with the foreground 3D object model scaled based on the size selected at block 302.

At block 306, the system determines whether there are any additional foreground 3D object models to process using block 304. If so, the system selects one of the unprocessed additional foreground 3D object models, and proceeds back to block 304 to generate multiple rotations for that unprocessed model, each with the model scaled based on the size selected at block 302.

After all foreground 3D object models are processed in multiple iterations of blocks 304 and 306, the system, at block 308, selects a foreground 3D object and rotation (from the plurality generated at multiple iterations of block 304). After selecting the foreground 3D object and rotation, that particular foreground 3D object and rotation combination can optionally be marked as "done", preventing it from being selected in subsequent iterations of block 308.

At block 310, the system renders, in a foreground layer and at a random location, the selected 3D object at the selected rotation (and at the size). In some implementations, the system, before rendering the object at the random location, can ensure that one or more constraints will not be violated by the rendering at the random location. The constraints can include the cropping constraint and/or the overlap constraint mentioned herein. If the system determines constraint(s) are violated, the system can select an additional random location. This can continue until a threshold quantity of attempts have been made and/or until a threshold duration of time has passed. If the threshold quantity of attempts have been made and/or the threshold duration of time has passed, the decision of block 312 (below) can be "no", and the currently selected foreground 3D object and rotation can be used as the initially selected foreground 3D object and rotation for a next iteration of block 308 in generating a next foreground layer.

At block 312, the system determines whether to render an additional foreground object in the foreground layer. In some implementations, this determination can be "yes" so long as, in an immediately preceding iteration of block 310, the threshold quantity of attempts have not been made and/or the threshold duration of time has not passed. If, at block 312, the decision is yes, the system proceeds back to block 308 and selects an additional foreground 3D object and additional rotation, then proceeds to block 310 to attempt to render the additional foreground 3D object, at the additional rotation, in the foreground layer. Optionally, a constraint can prevent the same foreground 3D object from being rendered more than once (i.e., at different rotations) in the same foreground layer.

If, at block 312, the decision is no, the system proceeds to block 314 and generates a synthetic image based on fusing the foreground layer with a corresponding background layer. The corresponding background layer can be one generated using method 200 (FIG. 2) and can correspond to the foreground layer based at least in part on the size of the background objects in the background layer being similar to the size(s) of the foreground objects in the foreground layer. For example, the background objects in the background layer can be scaled based on the size/scaling of the foreground 3D objects used in generating the foreground layer.

Block 314 can optionally include sub-block 314A, wherein the system generates the synthetic image further based on fusing an occlusion layer with the background layer and the foreground layer. The occlusion layer can be generated based on rendering additional background 3D object(s) within bounding area(s) of rendered foreground 3D object(s) in the foreground layer. For example, the occlusion layer can be generated by randomly selecting background 3D object model(s), and rendering each in a corresponding random location within a corresponding bounding box that bounds one of the foreground objects in the foreground layer. The occluding object can be randomly scaled such that its projection covers a certain percentage of the corresponding foreground object.

In some implementations, at block 314 the system, in generating the synthetic image, renders the occlusion layer on top of the foreground layer and renders the result on top of the background layer. In some of those implementations, random light sources are added, optionally with random perturbations in the light color. Additionally or alternatively, white noise can be added and/or the synthetic image blurred with a Gaussian kernel, such as one where both the kernel size and the standard deviation are randomly selected.

At block 316, the system generates a training instance that includes the synthetic image, and label(s) for the rendering of the foreground 3D object model(s) in the synthetic image. The label(s) can include, for example and for each of the rendered foreground objects: a corresponding 2D bounding box (or other bounding shape), a corresponding six-dimensional (6D) pose, a corresponding classification, a corresponding semantic labelmap, and/or any other relevant labeling data. The labels can be easily determined as the foreground 3D objects and their rotations are known in generating the foreground layer.

At block 318, the system determines whether there are additional unprocessed foreground 3D object, rotation pairs. In other words, whether there are any foreground 3D object, rotation pairs that have not yet been rendered in a foreground layer (and thereby included in a synthetic image). If so, the system proceeds back to block 308 and, then performs iterations of blocks 308, 310, 312 in generating an additional foreground layer based on unprocessed foreground 3D objects and rotations, and generates an additional synthetic image at block 314 based on the additional foreground layer. In these and other manners, through multiple iterations synthetic images are generated that collectively include, for the size of block 302, renderings of all foreground 3D object models at all generated rotations.

If the decision at an iteration of block 318 is no, the system proceeds to block 320 and determines whether an additional size, for foreground objects, should be utilized. If so, the system proceeds back to block 302, and selects another size (e.g., a smaller size). Blocks of method 300 can then be repeated to generate another batch of synthetic images with foreground object(s) rendered based on the additional size.

If the decision at an iteration of block 320 is no, the system can stop synthetic image and synthetic training instance generation.

FIG. 4 is a flowchart illustrating an example method 400 of training a machine learning model according to a curriculum, according to various implementations disclosed herein. For convenience, the operations of the flow chart are described with reference to a system that performs the operations. This system may include one or more processors, such as one or more processors implementing training engine 130 (FIG. 1). While operations of method 400 are shown in a particular order, this is not meant to be limiting. One or more operations may be reordered, omitted, or added.

At block 402, the system selects training instances with synthetic images having foreground object(s) at larger size(s). For example, the system can select training instances, generated according to method 300, that all include synthetic images with foreground objects that are of a first size or scale, or within a threshold percentage (e.g., 10%) of the first size or scale. This can include tens of thousands, or hundreds of thousands of training instances. As described herein, in various implementations the background objects of the synthetic images of the training instances can be of a similar size as the foreground objects. As also described herein, in various implementations the synthetic images of the training instances can, collectively, include all foreground objects of interest, and can, collectively, include each of the foreground objects at a large quantity of uniformly distributed rotations.

At block 404, the system trains the machine learning model based on the selected training instances. For example, at block 404 the system can iteratively train the machine learning model, using a batch of the training instances at each iteration. In training the machine learning model, predictions can be made based on processing the synthetic images of the training instances, those predictions compared to labels of the training instances to determine errors, and weights of the machine learning model iteratively updated based on the errors. For example, the weights of the machine learning model can be updated using backpropagation, and optionally utilizing a loss function that is based on the errors. It is noted that for some machine learning model(s) only certain weights may be updated, while others can be fixed/static throughout training. For example, some machine learning models can include a pre-trained image feature extractor that can optionally be fixed during training, and additional layers that further process extracted features and that include nodes with trainable weights. It is also noted that various machine learning models can be trained, such as object detection and/or classification models. For example, the machine learning model can be a Faster R-CNN model or other object detection and classification model.

At block 406, the system selects, upon the completion of block 404, additional training instances with synthetic images having foreground object(s) at smaller size(s). In an initial iteration of block 406, the smaller size(s) are smaller relative to the larger size(s) of block 402. At subsequent iterations of block 406, the smaller size(s) are smaller relative to the most recent iteration of block 406. For example, the system can select training instances, generated according to method 300, that all include synthetic images with foreground objects that are of a second size or scale, or within a threshold percentage (e.g., 10%) of the second size or scale. This can include tens of thousands, or hundreds of thousands of training instances. As described herein, in various implementations the background objects of the synthetic images of the training instances can be of a similar size as the foreground objects. As also described herein, in various implementations the synthetic images of the training instances can, collectively, include all foreground objects of interest, and can, collectively, include each of the foreground objects at a large quantity of uniformly distributed rotations.

At block 408, the system further trains the machine learning model based on the selected additional training instances. For example, at block 404 the system can iteratively further train the machine learning model, using a batch of the additional training instances at each iteration.

At block 410, and upon completion of block 408, the system determines whether there are yet additional training instances having synthetic images with foreground objects at even smaller size(s) (relative to those utilized in a most recent iteration of block 408). If so, the system proceeds back to block 406. If not, the system proceeds to block 412, at which the system can deploy the machine learning model. Optionally, at block 412 the system deploys the machine learning model only after determining one or more training criteria are satisfied (e.g., that are in addition to no additional training instances remaining). The machine learning model can be deployed (e.g., transmitted to or otherwise caused to be stored locally at) to computing device(s) and/or robotic device(s). For example, the machine learning model can be deployed at a robot for use by the robot in performing various robotic tasks.

Turning now to FIGS. 5A, 5B, 5C, and 5D, some example synthetic images 500A-500D are illustrated. For simplicity, each of the synthetic images 500A-500D include a corresponding detailed view of only a corresponding portion 500A1-500D1 of the synthetic images 500A-500D. Each of the synthetic images 500A-500D also includes a corresponding background objects descriptor 552A-D and a corresponding foreground object descriptor 554A-D of one of the foreground objects. It is noted that the descriptors 552A-D and 554A-D will not actually be included with the synthetic images 500A-D, but are provided herein solely for explanatory purposes.

Figure 5A:
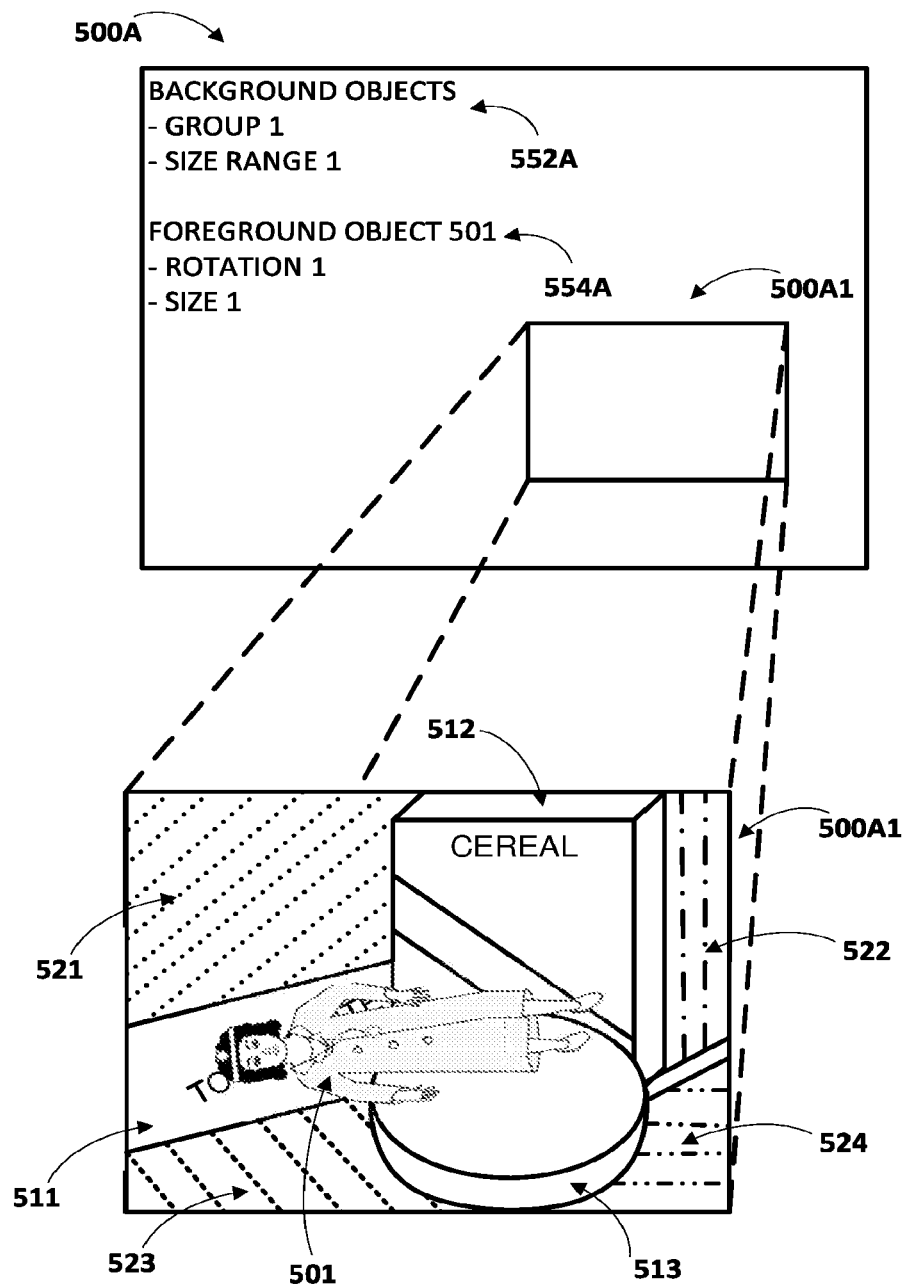
FIG. 5A, FIG. 5B, FIG. 5C, and FIG. 5D illustrate example synthetic images according to various implementations disclosed herein.

Turning initially to FIG. 5A, synthetic image 500A includes, as indicated by background object descriptor 552A, a first group of background objects that are all within a first size range. Synthetic image 500A can also include one or more foreground objects, one of which (foreground object 501) is described by foreground object descriptor 554A. As indicated by foreground object descriptor 554A, foreground object 501 has, in synthetic image 500A, a first rotation and a first size that corresponds to the first size range of the background objects. Other foreground object(s) (not illustrated) can also be provided in synthetic image 500A, and can be of different object(s). Those different object(s) can be at different rotations than the rotation of object 501, but those object(s) will also be of the same or similar size/scale as object 501.

Portion 500A1 illustrates the first size and first rotation of object 501. Further, portion 500A1 illustrates some of the background objects 511, 512, and 513. As can be ascertained by viewing background objects 511, 512, and 513, they are of a similar size/scale relative to one another, and relative to object 501. Representations 521, 522, 523 of other background objects are also illustrated in portion 500A1 as different shadings for simplicity purposes. In other words, representations 521, 522, 523 are merely representative of other background objects that would actually be rendered in detail and would be of a similar size/scale as objects 511, 512, and 513—but are represented as different shadings solely for simplicity of FIG. 5A. Collectively, the background objects 511, 512, and 513, and those represented by representations 521, 522, and 523 cover the background in portion 500A1 (i.e., no bare spots) and represent a subset of the background objects of the synthetic image 500A.

Figure 5B:
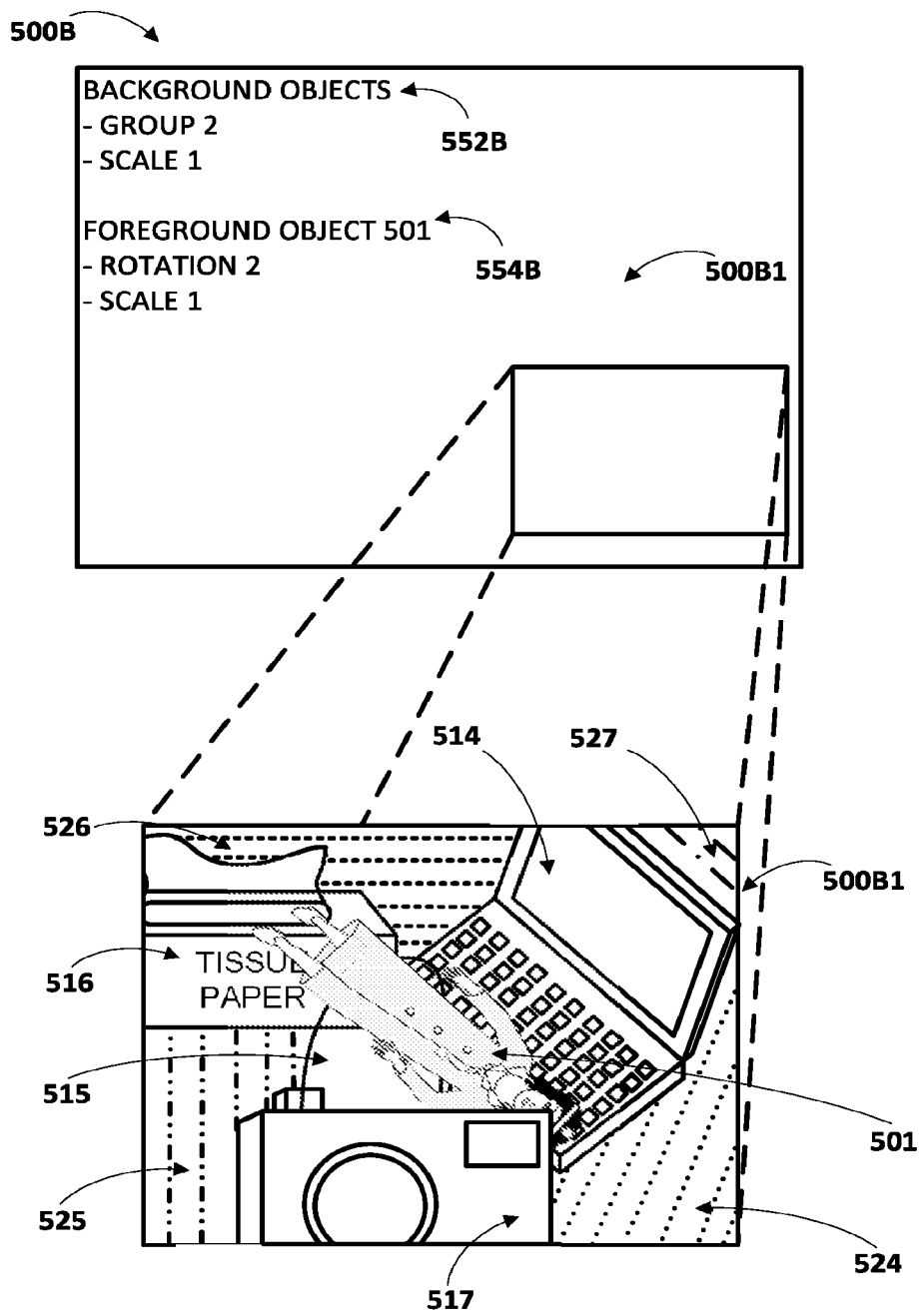

Turning next to FIG. 5B, synthetic image 500B includes, as indicated by background object descriptor 552B, a second group of background objects that are all within a first size range. The second group can differ from the first group of synthetic image 500A in that different background objects are included and/or are rendered at different rotations. Synthetic image 500B can also include one or more foreground objects, one of which (foreground object 501) is described by foreground object descriptor 554B. As indicated by foreground object descriptor 554B, foreground object 501 has, in synthetic image 500B, a second rotation and a first size. The second rotation of foreground object 501 in synthetic image 500B differs from the first rotation of foreground object 501 in synthetic image 500A (i.e., a different in-plane rotation). The first size of foreground object 501 in synthetic image 500B is the same as the first size of foreground object 501 in synthetic image 500A. Other foreground object(s) (not illustrated) can also be provided in synthetic image 500B, and can be of different object(s), one or more of which can differ from the different foreground objects in synthetic image 500A. Those different object(s) can be at different rotations than the rotation of object 501 in synthetic image 500B, but those object(s) will also be of the same or similar size/scale as object 501.

Portion 500B1 illustrates the first size and second rotation of object 501. Further, portion 500B1 illustrates some of the background objects 514, 515, and 516. As can be ascertained by viewing background objects 514, 515, and 516, they are of a similar size/scale relative to one another, and relative to object 501. Representations 524, 524, 526, and 527 of other background objects are also illustrated in portion 500B1 as different shadings for simplicity purposes. In other words, representations 524, 524, 526, and 527 are merely representative of other background objects that would actually be rendered in detail and would be of a similar size/scale as objects 514, 515, and 516—but are represented as different shadings solely for simplicity of FIG. 5B. Collectively, the background objects 514, 515, and 516, and those represented by representations 524, 524, 526, and 527 cover the background of portion 500B1 (i.e., no bare spots) and represent a subset of the background objects of the synthetic image 500A. Occluding object 517 is an object that can be rendered in an occlusion layer as described herein, and partially occludes part of the object 501.

Synthetic images 500A and 500B thus illustrate how object 501 can be provided at the same size in multiple synthetic images, but in different rotations and at different locations—and amongst different background object(s) and/or with different occlusion(s) (or none) in the multiple synthetic images. It is noted that, according to techniques described herein, object 501 will be included, at the same size, in multiple additional synthetic images. In those additional synthetic images the object 501 will be at different rotations (including those with alternate out-of-plane rotations) and can be at different locations and/or amongst different background clutter and/or occluded in different manners and/or with different objects.

Figure 5C:
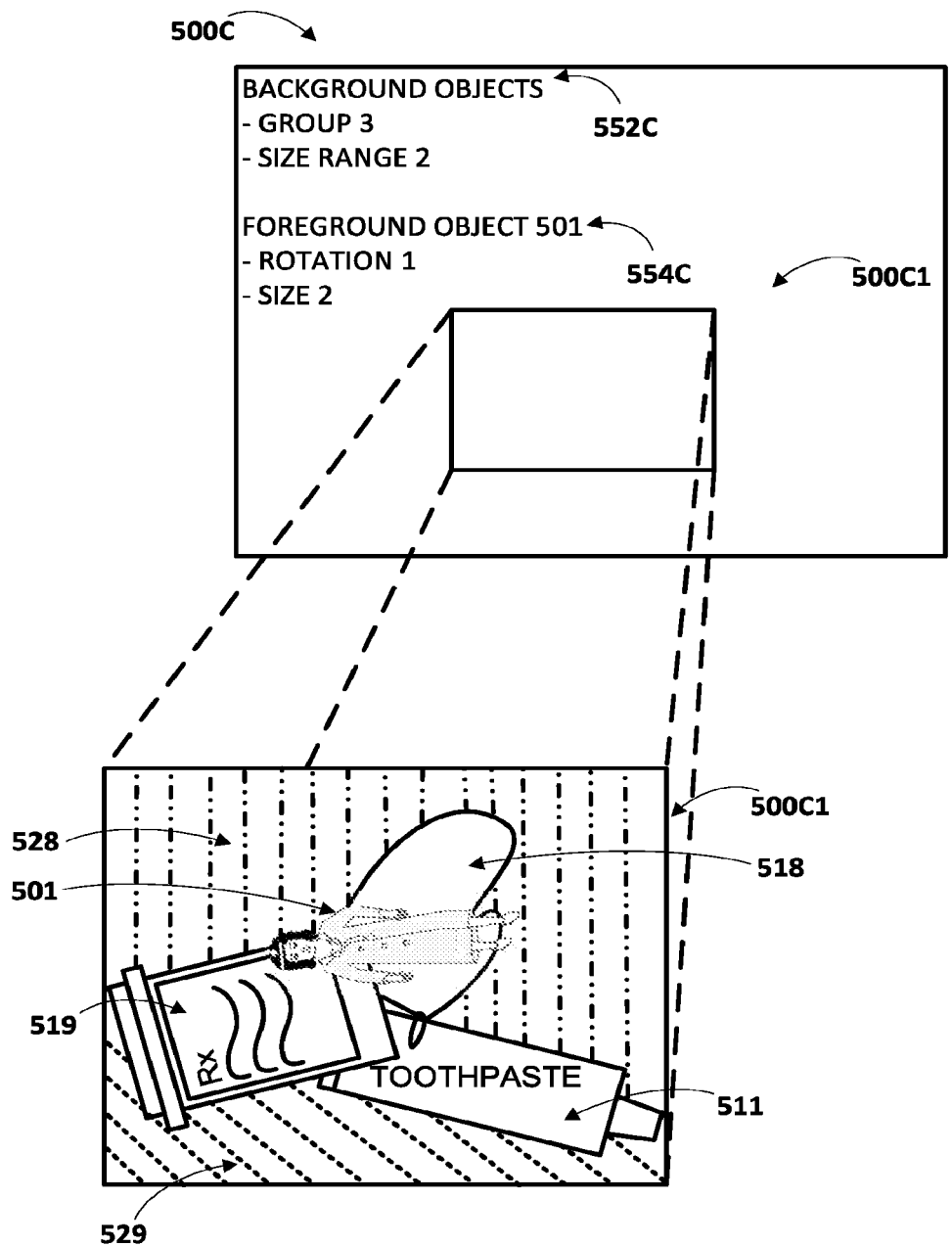
Figure 5D:
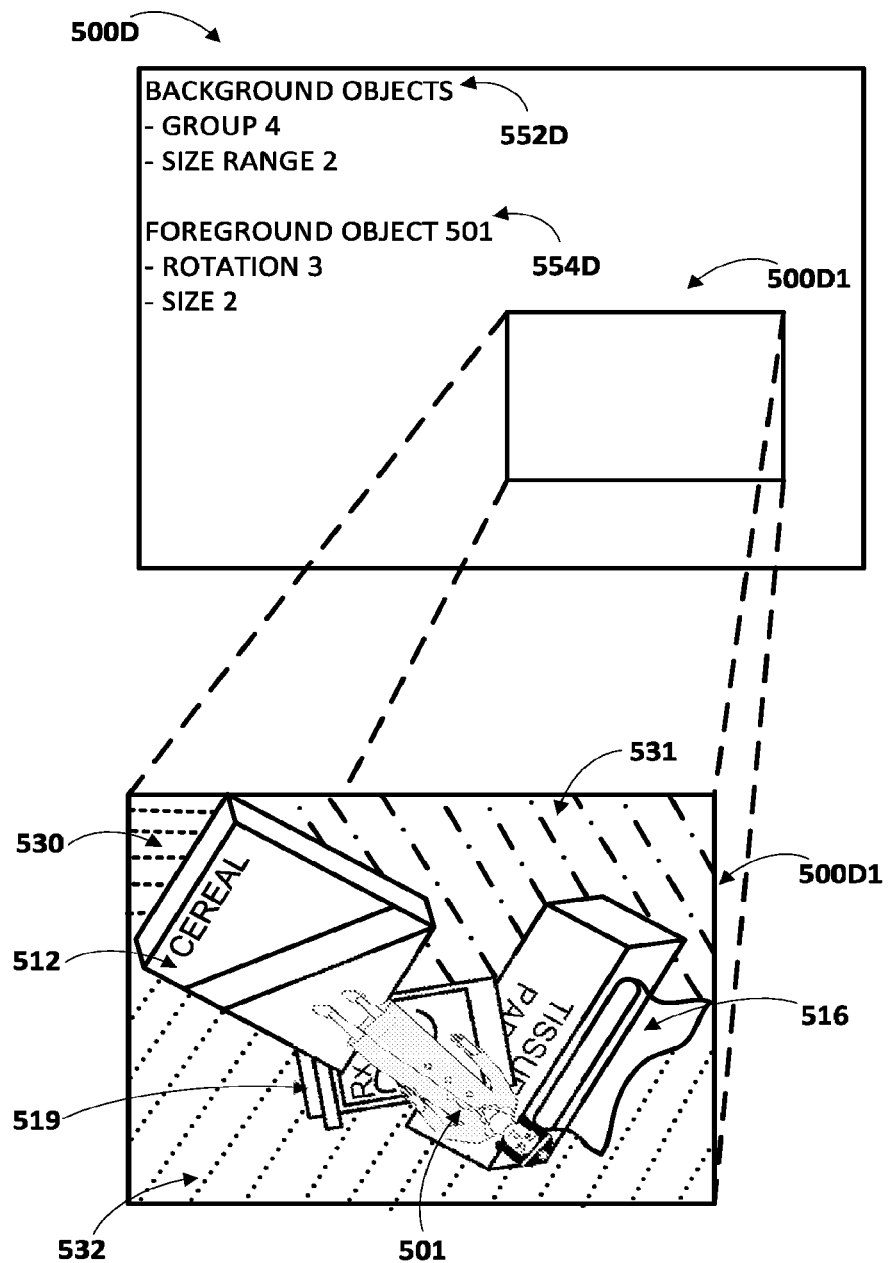

Turning next to FIGS. 5C and 5D, synthetic images 500C and 500D also include the object 501 but, as described below, include the object at a smaller size. In FIG. 5C, synthetic image 500C includes, as indicated by background object descriptor 552C, a third group of background objects that are all within a second size range. The second size range differs from the first size range of the background objects of FIGS. 5A and 5B, and includes smaller size values. The second size range corresponds to the smaller size of foreground object 501 in synthetic image 500C and other foreground object(s). The third group of background objects can differ from the first and second groups of synthetic images 500A and 500B, in addition to sizes, in that different background objects are included and/or are rendered at different rotations.

Synthetic image 500C can also include one or more foreground objects, one of which (foreground object 501) is described by foreground object descriptor 554C. As indicated by foreground object descriptor 554C, foreground object 501 has, in synthetic image 500C, a first rotation and a second size. The first rotation of foreground object 501 in synthetic image 500C is the same as the first rotation of foreground object 501 in synthetic image 500A, although the foreground object 501 is in different locations in the two synthetic images 500A and 500C. Moreover, the second size of foreground object 501 in synthetic image 500C is the smaller than its size in synthetic images 500A and 500B. Other foreground object(s) (not illustrated) can also be provided in synthetic image 500C, and can be of different object(s). Those different object(s) can be at different rotations than the rotation of object 501 in synthetic image 500C, but those object(s) will also be of the same or similar size/scale as object 501 in synthetic image 500C.

Portion 500C1 illustrates the second size and first rotation of object 501. Further, portion 500C1 illustrates some of the background objects 511, 518, and 519. As can be ascertained by viewing background objects 511, 518, and 519, they are of a similar size/scale relative to one another, and relative to object 501. Representations 528 and 529 of other background objects are also illustrated in portion 500C1 as different shadings for simplicity purposes. In other words, representations 528 and 529 are merely representative of other background objects that would actually be rendered in detail and would be of a similar size/scale as objects 511, 518, and 519—but are represented as different shadings solely for simplicity of FIG. 5C. Collectively, the background objects 511, 518, and 519, and those represented by representations 528 and 529 cover the background of portion 500C1 and represent a subset of the background objects of the synthetic image 500C.

In FIG. 5D, synthetic image 500D includes, as indicated by background object descriptor 552D, a third group of background objects that are all within a second size range. The second size range corresponds to the smaller size of foreground object 501 and other foreground object(s) in synthetic image 500D. The third group of background objects can differ from the first, second, and third groups of synthetic images 500A, 500B, and 500C in that different background objects are included and/or are rendered at different rotations and/or different locations.

Synthetic image 500D can also include one or more foreground objects, one of which (foreground object 501) is described by foreground object descriptor 554D. As indicated by foreground object descriptor 554D, foreground object 501 has, in synthetic image 500D, a third rotation and a second size. The third rotation of foreground object 501 in synthetic image 500C is different (in-plane) from the first and second rotations of synthetic images 500A, 500B, and 500C. The second size of foreground object 501 in synthetic image 500D is the same as that in synthetic images 500C. Other foreground object(s) (not illustrated) can also be provided in synthetic image 500D, and can be of different object(s). Those different object(s) can be at different rotations than the rotation of object 501 in synthetic image 500D, but those object(s) will also be of the same or similar size/scale as object 501 in synthetic image 500D.

Portion 500D1 illustrates the second size and first rotation of object 501. Further, portion 500C1 illustrates some of the background objects 512, 516, and 519. As can be ascertained by viewing background objects 512, 516, and 519, they are of a similar size/scale relative to one another, and relative to object 501. Representations 530, 531, and 532 of other background objects are also illustrated in portion 500D1 as different shadings for simplicity purposes. In other words, representations 530, 531, and 532 are merely representative of other background objects that would actually be rendered in detail and would be of a similar size/scale as objects 512, 516, and 519—but are represented as different shadings solely for simplicity of FIG. 5C. Collectively, the background objects 512, 516, and 519, and those represented by representations 530, 531, and 532 cover the background of portion 500D1 and represent a subset of the background objects of the synthetic image 500D.

Synthetic images 500C and 500D thus illustrate how object 501 can be provided at the same size (that is different from that of synthetic images 500A and 500B) in multiple synthetic images, but in different rotations and at different locations—and amongst different background object(s) and/or with different occlusion(s) (or none) in the multiple synthetic images. It is noted that, according to techniques described herein, object 501 will be included, at the same second size, in multiple additional synthetic images. In those additional synthetic images the object 501 will be at different rotations (including those with alternate out-of-plane rotations) and can be at different locations and/or amongst different background clutter and/or occluded in different manners and/or with different objects. As described herein, training of a machine learning model can be performed based on synthetic images 500A, 500B, and a large quantity of additional synthetic images with similar sized foreground objects as those of synthetic images 500A and 500B. After training on such synthetic images, the machine learning model can subsequently be further trained based on synthetic images 500C, 500D, and a large quantity of additional synthetic images with similar sized foreground objects as those of synthetic images 500C and 500D.

Figure 6:
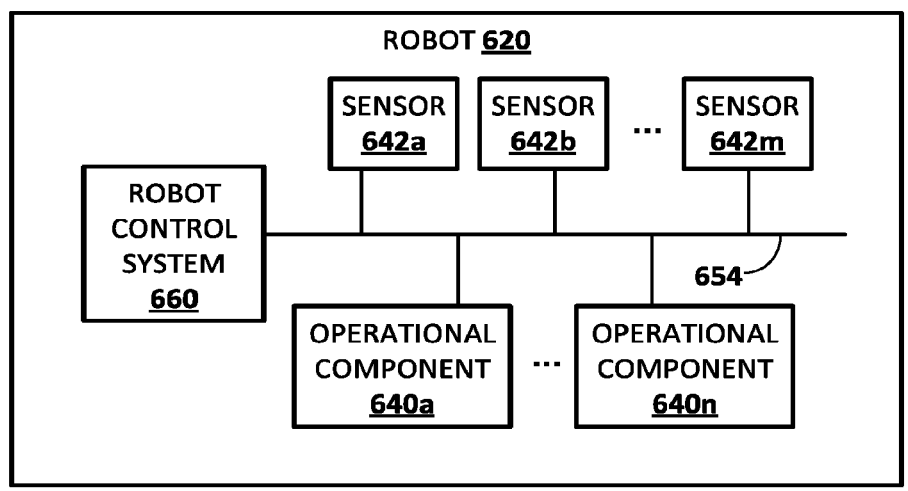
FIG. 6 schematically depicts an example architecture of a robot.

FIG. 6 schematically depicts an example architecture of a robot 600. The robot 600 includes a robot control system 602, one or more operational components 604a-n, and one or more sensors 608a-m. The sensors 608a-m may include, for example, vision sensors (e.g., camera(s), 3D scanners), light sensors, pressure sensors, positional sensors, pressure wave sensors (e.g., microphones), proximity sensors, accelerometers, gyroscopes, thermometers, barometers, and so forth. While sensors 608a-m are depicted as being integral with robot 600, this is not meant to be limiting. In some implementations, sensors 608a-m may be located external to robot 600, e.g., as standalone units.

Operational components 604a-n may include, for example, one or more end effectors (e.g., grasping end effectors) and/or one or more servo motors or other actuators to effectuate movement of one or more components of the robot. For example, the robot 600 may have multiple degrees of freedom and each of the actuators may control actuation of the robot 600 within one or more of the degrees of freedom responsive to control commands provided by the robot control system 602 (e.g., torque and/or other commands generated based on a control policy). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 602 may be implemented in one or more processors, such as a CPU, GPU, and/or other controller(s) of the robot 600. In some implementations, the robot 600 may comprise a "brain box" that may include all or aspects of the control system 602. For example, the brain box may provide real time bursts of data to the operational components 604a-n, with each of the real time bursts comprising a set of one or more control commands that dictate, inter alia, the parameters of motion (if any) for each of one or more of the operational components 604a-n. In various implementations, the control commands can be at least selectively generated by the control system 602 based at least in part on object detections, object classifications, and/or other determination(s) made using a machine learning model that is stored locally on the robot 620 and that is trained according to implementations described herein.

Although control system 602 is illustrated in FIG. 6 as an integral part of the robot 600, in some implementations, all or aspects of the control system 602 may be implemented in a component that is separate from, but in communication with, robot 600. For example, all or aspects of control system 602 may be implemented on one or more computing devices that are in wired and/or wireless communication with the robot 600, such as computing device 710.

Figure 7:
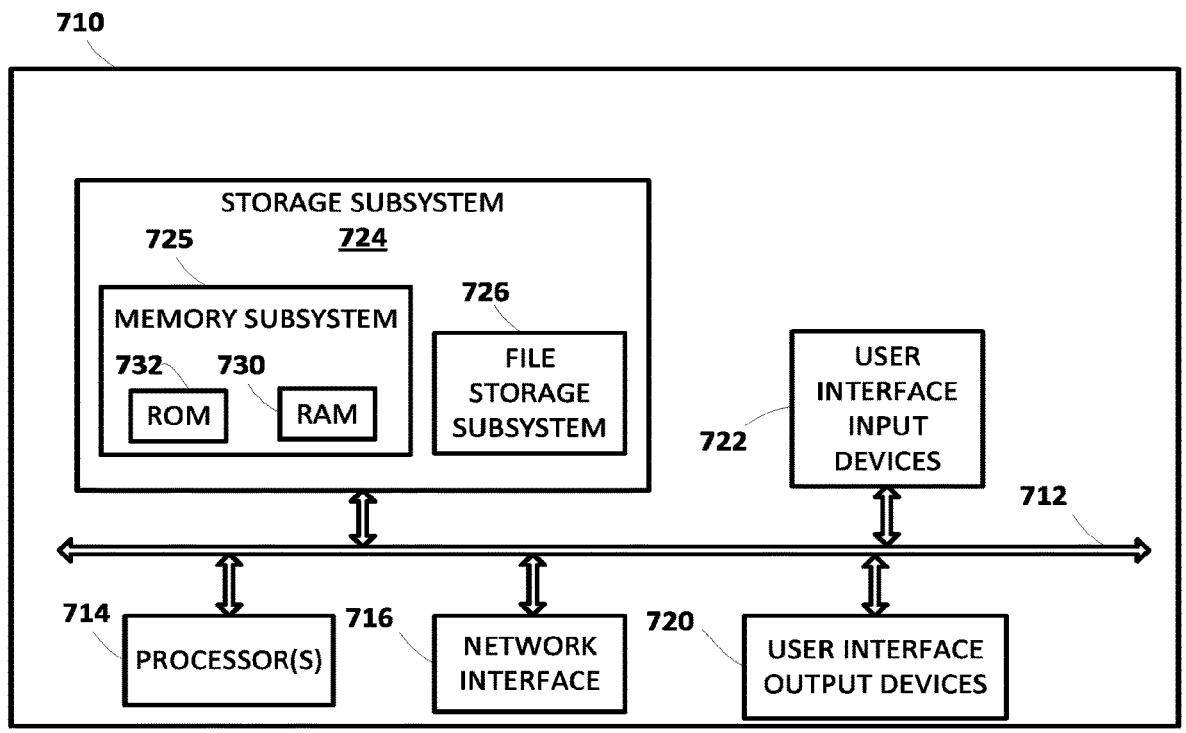
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

What is claimed is:

1. A method implemented by one or more processors, the method comprising:
for each of a plurality of selected background 3D object models:
rendering the background 3D object model, at a corresponding random background location in a background layer and with a random hue,
for each of one or more selected foreground 3D object models:
rendering the foreground 3D object model, at a corresponding random foreground location in a foreground layer;
for each of one or more selected occluding 3D object models:
rendering the occluding 3D object model, at a corresponding random occluding location in an occlusion layer;
wherein during rendering of the background object models, the one or more foreground 3D object models, and the occluding 3D object model, at least one light source is randomly applied with a random light color;
generating a synthetic image based on fusing the rendering of the background layer, the foreground layer, and the occlusion layer;
assigning, to the synthetic image, a ground truth label for the rendering of the one or more foreground 3D object models; and
providing a training instance, that includes the synthetic image paired with the ground truth label, for training of at least one machine learning model based on the training instance.

2. The method of claim 1, wherein white noise is added during rendering of the one or more foreground 3D object model and/or during rendering of the one or more background 3D object models.

3. The method of claim 1, further comprising blurring the synthetic image.

4. The method of claim 3, wherein blurring the synthetic image comprises blurring the synthetic image with a randomly selected kernel.

5. The method of claim 1, wherein rendering the background 3D object model at the corresponding random background location in the background layer comprises selecting the background location based on no other background 3D object having yet been rendered at the background location, and wherein the rendering is iteratively performed, each time for an additional one of the background 3D object models, until it is determined that all locations, of the background layer, have content rendered thereon.

6. The method of claim 1, wherein rendering the background 3D object model, at the corresponding random background location in the background layer, comprises rendering the background 3D object model at a random background rotation.

7. The method of claim 1, wherein rendering the foreground 3D object model, at the corresponding random foreground location in the foreground layer, comprises rendering the foreground 3D object model at a random foreground rotation.

8. The method of claim 1, wherein rendering the occluding 3D object model, at the corresponding random foreground location in the occlusion layer, comprises rendering the foreground 3D object model at a random occlusion rotation.

9. The method of claim 1, wherein the ground truth label comprises a bounding shape for the foreground object, a six-dimensional (6D) pose for the foreground object, and/or a classification for the foreground object.

10. The method of claim 9, wherein the ground truth label comprises the bounding shape, and wherein the bounding shape is a two-dimensional bounding box.

11. A system comprising:
memory storing instructions; and
one or more processors that execute the instructions to cause the one or more processors to:
for each of a plurality of selected background 3D object models:
render the background 3D object model, at a corresponding random background location in a background layer and with a random hue,
for each of one or more selected foreground 3D object models:
render the foreground 3D object model, at a corresponding random foreground location in a foreground layer;
for each of one or more selected occluding 3D object models:
render the occluding 3D object model, at a corresponding random occluding location in an occlusion layer;
wherein during rendering of the background object models, the one or more foreground 3D object models, and the occluding 3D object model, at least one light source is randomly applied with a random light color;
generate a synthetic image based on fusing the rendering of the background layer, the foreground layer, and the occlusion layer;
assign, to the synthetic image, a ground truth label for the rendering of the one or more foreground 3D object models; and
provide a training instance, that includes the synthetic image paired with the ground truth label, for training of at least one machine learning model based on the training instance.

12. The system of claim 11, wherein white noise is added during rendering of the one or more foreground 3D object models.

13. The system of claim 11, wherein one or more of the processors, in executing the instructions, are further to:
blur the synthetic image.

14. The system of claim 11, wherein one or more of the processors, in executing the instructions, are further to:
blur the synthetic image with a randomly selected kernel.

15. The system of claim 11, wherein in rendering the background 3D object model at the corresponding random background location in the background layer, one or more of the processors are to select the background location based on no other background 3D object having yet been rendered at the background location, and wherein the rendering is iteratively performed, each time for an additional one of the background 3D object models, until it is determined that all locations, of the background layer, have content rendered thereon.

16. The system of claim 11, wherein in rendering the background 3D object model at the corresponding random background location in the background layer, one or more of the processors are to render the background 3D object model at a random background rotation.

17. The system of claim 11, wherein in rendering the foreground 3D object model, at the corresponding random foreground location in the foreground layer, one or more of the processors are to render the foreground 3D object model at a random foreground rotation.

18. The system of claim 11, wherein in rendering the occluding 3D object model, at the corresponding random foreground location in the occlusion layer, one or more of the processors are to render the foreground 3D object model at a random occlusion rotation.

19. The system of claim 11, wherein the ground truth label comprises a bounding shape for the foreground object, a six-dimensional (6D) pose for the foreground object, and/or a classification for the foreground object.

20. The system of claim 11, wherein the ground truth label comprises the bounding shape, and wherein the bounding shape is a two-dimensional bounding box.

* * * * *